(12) United States Patent
Huber et al.

(10) Patent No.: US 12,013,673 B2
(45) Date of Patent: Jun. 18, 2024

(54) BUILDING CONTROL SYSTEM USING REINFORCEMENT LEARNING

(71) Applicant: Johnson Controls Tyco IP Holdings LLP, Milwaukee, WI (US)

(72) Inventors: Michael M. Huber, Hartland, WI (US); Gerald A. Asp, Milwaukee, WI (US); Daniel A. Mellenthin, West Allis, WI (US); Jeffrey J. G. Senzig, Franklin, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 145 days.

(21) Appl. No.: 17/537,179

(22) Filed: Nov. 29, 2021

(65) Prior Publication Data
US 2023/0168649 A1  Jun. 1, 2023

(51) Int. Cl.
*G05B 19/042* (2006.01)
*G06N 3/08* (2023.01)
*G06N 5/022* (2023.01)

(52) U.S. Cl.
CPC ............ *G05B 19/042* (2013.01); *G06N 3/08* (2013.01); *G06N 5/022* (2013.01); *G05B 2219/25011* (2013.01)

(58) Field of Classification Search
CPC ........ G05B 19/042; G05B 2219/25011; G05B 13/027; G06N 3/092
See application file for complete search history.

(56) References Cited

U.S. PATENT DOCUMENTS

| | | | |
|---|---|---|---|
| 5,301,109 A | 4/1994 | Landauer et al. |
| 5,446,677 A | 8/1995 | Jensen et al. |
| 5,581,478 A | 12/1996 | Cruse et al. |
| 5,812,962 A | 9/1998 | Kovac |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

U.S. Appl. No. 17/383,213.
(Continued)

*Primary Examiner* — Michael W Choi
(74) *Attorney, Agent, or Firm* — Foley & Lardner LLP

(57) ABSTRACT

Sensorized commercial buildings are a rich target for building a new class of applications that improve operational and energy efficiency of building operations that take into account human activities. Such applications, however, rarely experience widespread adoption due to the lack of a common descriptive schema that would enable porting these applications and systems to different buildings. Our demo presents Brick [4], a uniform schema for representing metadata in buildings. Our schema defines a concrete ontology for sensors, subsystems and relationships among them, which enables portable applications. Using a web application, we will demonstrate real buildings that have been mapped to the Brick schema, and show application queries that extracts relevant metadata from these buildings. The attendees would be able to create example buildings and write their own queries.

16 Claims, 20 Drawing Sheets

(56) References Cited

U.S. PATENT DOCUMENTS

| | | |
|---|---|---|
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,447,985 B2 | 9/2016 | Johnson |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,402,723 B1 * | 9/2019 | Silberman ............ G06N 3/006 |
| 10,465,931 B2 | 11/2019 | Barrett |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,871,756 B2 | 12/2020 | Johnson et al. |
| 10,908,578 B2 | 2/2021 | Johnson et al. |
| 10,921,760 B2 | 2/2021 | Harvey |
| 10,921,768 B2 | 2/2021 | Johnson et al. |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,156,978 B2 | 10/2021 | Johnson et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |

(56) References Cited

U.S. PATENT DOCUMENTS

| | | |
|---|---|---|
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0305718 A1 | 12/2010 | Clark et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2011/0231320 A1* | 9/2011 | Irving .................. G06Q 30/08 713/300 |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2014/0337256 A1 | 11/2014 | Varadi et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0178865 A1* | 6/2015 | Anderson ............ G06Q 50/163 705/7.25 |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0305678 A1 | 10/2016 | Pavlovski et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |

(56) References Cited

U.S. PATENT DOCUMENTS

| | | |
|---|---|---|
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315523 A1 | 11/2017 | Cross et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2018/0375444 A1 | 12/2018 | Gamroth |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0171173 A1* | 6/2019 | Dibowski ............ G05B 19/042 |
| 2019/0268178 A1 | 8/2019 | Fairweather et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0180891 A1 | 6/2021 | Rousselet et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0026864 A1 | 1/2022 | Murugesan et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2022/0373209 A1* | 11/2022 | Ko ........................... F24F 11/63 |
| 2023/0010757 A1 | 1/2023 | Preciado |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 186 687 A4 | 7/2017 |
| EP | 3 324 306 A1 | 5/2018 |
| EP | 3 497 377 A1 | 6/2019 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

Afram, et al., "Artificial neural network (ANN) based model predictive control (MPC) and optimization of HVAC systems: A state of the art review and case study of a residential HVAC system," Energy and Buildings, 141, 2017, pp. 96-113.

Afram, et al., "Theory and applications of HVAC control systems—A review of model predictive control (MPC)," Building and Environment, 72, 2014, pp. 343-355.

Bengea, et al. "Model predictive control for mid-size commercial building hvac: Implementation, results and energy savings," Second International Conference on Building Energy and Environment, 2012, pp. 979-986.

Bingqing, et al., "Gnu-RL: A Precocial Reinforcement Learning Solution for Building HVAC Control Using a Differentiable MPC Policy," Proceedings of the 6th ACM International Conference on Systems for Energy-Efficient Buildings, Cities, and Transportation, 2019, pp. 316-325.

Cannon, "Efficient nonlinear model predictive control algorithms," Annual Reviews in Control 28, 2, 2004, 229-237.

EIA—US Energy Information Administration," Annual Energy Outlook 2018," Feb. 6, 2018, 74 pages.

Eini, et al., "Learning-based Model Predictive Control for Smart Building Thermal Management," 2019 IEEE 16th International

(56) References Cited

OTHER PUBLICATIONS

Conference on Smart Cities: Improving Quality of Life Using ICT & IoT and AI (HONET-ICT), 2019, 5 pages.
El Sallab, et al., "Deep reinforcement learning framework for autonomous driving," Electronic Imaging, 19, 2017, pp. 70-76.
Erickson, et al., "Occupancy Based Demand Response HVAC Control Strategy," BuildSys 2010, Nov. 2, 2010, 7 pages.
Gao, et al., "Energy-Efficient Thermal Comfort Control in Smart Buildings via Deep Reinforcement Learning," arXiv preprint arXiv:1901.04693, 2019, 11 pages.
Gros, et al., "From Linear to Nonlinear MPC: Bridging the Gap via the Real-Time Iteration," Internat. J. Control 93, 1, 2020, pp. 62-80.
Gu, et al. "Deep Reinforcement Learning For Robotic Manipulation with Asynchronous Off-Policy Updates," IEEE International Conference on Robotics and Automation (ICRA), 2017, pp. 3389-3396.
Hausknecht, et al., "Deep Recurrent Q-Learning for Partially Observable MDPs," AAAI Fall Symposium Series, 2015, 9 pages.
Henderson, et al., "Deep Reinforcement Learning that Matters," The Thirty-Second AAAI Conference on Artificial Intelligence, 2018, pp. 3207-3214.
Henze, et al., "Evaluation of Optimal Control for Active and Passive Building Thermal Storage," International Journal of Thermal Sciences, 43, 2, 2004, pp. 173-183.
Huang, et al., "Model Predictive Control for Energy-Efficient Buildings: An Airport Terminal Building Study," 11th IEEE International Conference on Control & Automation (ICCA), 2014, 6 pages.
Jain, et al., "NeurOpt: Neural Network Based Optimization for Building Energy Management and Climate Control," arXiv preprint arXiv:2001.07831, 2020, 12 pages.
Jia, et al., "Advanced Building Control via Deep Reinforcement Learning," Energy Procedia, 158, Feb. 2019, pp. 6158-6163.
Kaelbling, et al., "Reinforcement Learning: A Survey," Journal of Artificial Intelligence Research, 4, 1996, pp. 237-285.
Killian, et al., "Ten Questions Concerning Model Predictive Control for Energy Efficient Buildings," Building and Environment, 105, 2016, pp. 403-412.
Kircher, et al., "Model Predictive Control of Thermal Storage for Demand Response," 2015 American Control Conference (ACC), 2015, 6 pages.
LeCun, et al., "Deep Learning," Nature, 521, May 28, 2015, pp. 436-444.
Li, et al., "Deep Reinforcement Learning: An Overview," arXiv preprint arXiv:1701.07274, 2017, 2 pages.
Li, et al., "Review of Building Energy Modeling for Control and Operation," Renewable and Sustainable Energy Reviews, 37, 2014, pp. 517-537.
Li, et al., "Transforming Cooling Optimization for Green Data Center via Deep Reinforcement Learning," IEEE Transactions on Cybernetics, 50, 5, May 2020, 11 pages.
Lu, et al., "Modeling and Forecasting Energy Consumption for Heterogeneous Buildings Using a Physical-Statistical Approach," Applied Energy, 144(C), 2015, pp. 261-275.
Ma, et al., "Demand Reduction in Building Energy Systems Based on Economic Model Predictive Control," Chemical Engineering Science 67, 1, Jan. 1, 2012, 92-100.
Ma, et al., "Economic model predictive control for building energy systems," ISGT 2011, Jan. 17-19, 2011, 12 pages.
Ma, et al., "Model Predictive Control for the Operation of Building Cooling Systems," IEEE Transactions on Control Systems Technology, 20, 3, May 3, 2012, pp. 796-803.
Ma, et al., "Stochastic Model Predictive Control for Building HVAC Systems: Complexity and Conservatism," IEEE Transactions on Control Systems Technology, 23, 1, 2014, 16 pages.
Mnih, et al., "Playing Atari with Deep Reinforcement Learning," arXiv preprint arXiv:1312.5602, 2013, 9 pages.
Nagy, et al., "Deep Reinforcement Learning for Optimal Control of Space Heating," arXiv preprint arXiv:1805.03777, 2018, 8 pages.
Oldewurtel, et al., "Use of Model Predictive Control and Weather Forecasts for Energy Efficient Building Climate Control," Energy and Buildings, 45, Feb. 2012, pp. 15-27.
Privara, et al., "Building Modeling as a Crucial Part for Building Predictive Control," Energy and Buildings, Jan. 2, 56013, pp. 8-22.
Risbeck, et al., "Economic Model Predictive Control for Time-Varying Cost and Peak Demand Charge Optimization," IEEE Trans. Automat. Control, 65, 7, Jul. 2020, 3 pages.
Schaul, et al. "Prioritized Experience Replay," arXiv preprint arXiv:1511.05952, 2015, 21 pages.
Smarra, et al., "Data-Driven Model Predictive Control Using Random Forests for Building Energy Optimization and Climate Control," Applied Energy, 226, 2018, pp. 1252-1272.
Sutton, R., "Introduction to Reinforcement Learning," Reinforcement Learning and Artificial Intelligence Laboratory, Department of Computer Science, University of Alberta, Canada, 1998, 20 pages.
Van Cutsem, et al., "Comparison of MPC Formulations for Building Control under Commercial Time-of-Use Tariffs," IEEE PowerTech Milan 2019, 2019, 7 pages.
Van Hasselt, et al., "Deep Reinforcement Learning With Double Q-Learning," Proceedings of the Thirtieth AAAI Conference on Artificial Intelligence (AAAI-16), 2016, 7 pages.
Van Staden, et al., "A Model Predictive Control Strategy for Load Shifting in a Water Pumping Scheme with Maximum Demand Charges," Applied Energy 88, Dec. 12, 2011, pp. 4785-4794.
Vinyals, et al., "Starcraft II: A New Challenge for Reinforcement Learning," Arxiv Preprint Arxiv:1708.04782, 2017, 20 pages.
Wang, et al., "Datadriven Model Predictive Control for Building Climate Control: Three Case Studies on Different Buildings," Building and Environment, 160, 2019, 12 pages.
Wang, et al., "Fast Model Predictive Control Using Online Optimization," IEEE Transactions on Control Systems Technology, 18, Mar. 2, 2010, pp. 267-278.
Wei, et al., "Deep Reinforcement Learning for Building HVAC Control," In Proceedings of the 54th Annual Design Automation Conference 2017, Institute of Electrical and Electronics Engineers, Inc., Jun. 18, 2017, 3 pages.
Yang, et al., "HVAC Energy Cost Optimization for a Multizone Building via a Decentralized Approach," IEEE Transactions on Automation Science and Engineering, 2020, 13 pages.
Yang, et al., "Model Predictive Control with Adaptive Machine-Learning-Based Model for Building Energy Efficiency and Comfort Optimization," Applied Energy, 271, 2020, 16 pages.
Zhang, et al., "Building HVAC Scheduling Using Reinforcement Learning via Neural Network Based Model Approximation," Buildsys'19, Nov. 13-14, 2019, 10 pages.
Zhang, et al., "Whole Building Energy Model for HVAC Optimal Control: A Practical Framework Based on Deep Reinforcement Learning," Energy and Buildings, 199, Sep. 15, 2019, pp. 472-490.
Zou, et al., "Towards Optimal Control of Air Handling Units Using Deep Reinforcement Learning and Recurrent Neural Network," Building and Environment, 168, Jan. 15, 2020, 3 pages.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://

(56) References Cited

OTHER PUBLICATIONS brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick, " BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation con-

(56) References Cited

OTHER PUBLICATIONS trol and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/US/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "Sparql: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

(56) References Cited

OTHER PUBLICATIONS

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

\* cited by examiner

BUILDING CONTROL SYSTEM USING REINFORCEMENT LEARNING

BACKGROUND

The present disclosure relates generally to the field of building automation systems. A building automation system (BAS) is, in general, a system of devices configured to control, monitor, and manage equipment in or around a building or building area. The BAS system may include one or more heating, ventilating, or air conditioning (HVAC) devices, which control and regulate various environmental factors within a building. Environmental factors may include temperature, humidity, etc. Often, these environmental factors are associated with providing a comfort level for one or more occupants of the building. Many BAS systems operate to control the environmental factor based on certain setpoints. However, various factors may adversely affect the ability of the BAS to regulate the environmental factors, requiring setpoint or other changes to the system. Further, these factors may result in a user modifying the operation of the BAS to obtain the quality level they desire.

SUMMARY

In one aspect, a building management system is disclosed. The building management system includes one or more memory devices configured to store instructions thereon that, when executed by one or more processors, cause the one or more processors to: determine a control policy based on building operation data of a previous time period, wherein the building operation data of the previous time period is associated with a business vertical; generate a prediction model for the control policy; and operate the building management system using the prediction model.

In some embodiments, the prediction model includes a reinforcement learning model, and the control policy includes one or more state-spaces for the reinforcement learning model.

In some embodiments, the prediction model includes a neural network, and the prediction model is associated with a business vertical.

In some embodiments, the prediction model is a first prediction model. The instructions further cause the one or more processors to determine a second prediction model based on the first prediction model, and the building management system is operated using the second prediction model.

In some embodiments, the second prediction model includes a neural network trained based on at least one state from a state-space of the first prediction model.

In some embodiments, the second prediction model includes a neural network trained based on at least one state from a state-space of the control policy and an action of the control policy for the at least one state.

In some embodiments, the first prediction model is viewable as a directed graphical model, and the second prediction model is at least partially based on the directed graphical model.

In some embodiments, the control policy includes one or more action-spaces, and the one or more action-spaces include one or more of a potential zone-air temperature setpoints.

In some embodiments, the prediction model includes a reinforcement learning model defined as a Markov decision process or a partially observable Markov decision process.

In some embodiments, the building operation data is based on one or both of simulated data or real-time building operation data.

Another aspect is a method for generating a prediction model for control of a building management system. The method includes determining, by a processing circuit, a control policy based on building operation data of a previous time period, wherein the building operation data of the previous time period is associated with a business vertical, generating, by the processing circuit, a prediction model for the control policy, and operating, by the processing circuit, the building management system using the prediction model.

In some embodiments, the prediction model includes a reinforcement learning model, the control policy includes one or more state-spaces for the reinforcement learning model, the prediction model includes a second control policy, and the second control policy is determined based on a reward performance.

In some embodiments, the control policy is a first control policy, the first control policy includes a baseline policy, the prediction model includes a second control policy determined based on a reward performance, and the method further includes generating, by the processing circuit, a second prediction model based on the second control policy, and operating, by the processing circuit, the building management system using the second prediction model.

In some embodiments, the second prediction model includes a neural network trained based on at least one state of a state-space of the second control policy and an action of the second control policy based on the at least one state.

In some embodiments, the building operation data includes at least one or more of current values, previous values, or forecasts for various points of a space of a building operatively connected to the processing circuit.

Another aspect is a building management system including: building equipment operatively connected to one or more processors; and one or more memory devices configured to store instructions thereon that, when executed by the one or more processors, cause the one or more processors to: determine a control policy based on building operation data of a previous time period, the building operation data is associated with a category; obtain a prediction model for the control policy based on the building operation data of the building operation data of the previous time period of the category; and operate the building equipment using the prediction model.

In some embodiments, the prediction model includes a neural network trained using at least a portion of the building operation data of the previous time period for the category.

In some embodiments, the neural network is configured to determine at least one setpoint for the building equipment based on a current state of the building equipment.

In some embodiments, the prediction model is a reinforcement learning model defined as a Markov decision process or a partially observable Markov decision process, and the control policy includes one or more state-spaces for the reinforcement learning model.

In some embodiments, the prediction model is a neural network trained using at least a portion of the building operation data, and the prediction model is selected from a plurality of prediction models trained using the building operation data associated with the category.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the figures, a building system with an environmental control system is shown, according to an exemplary embodiment.

Building Management System and HVAC System

Figure 1:
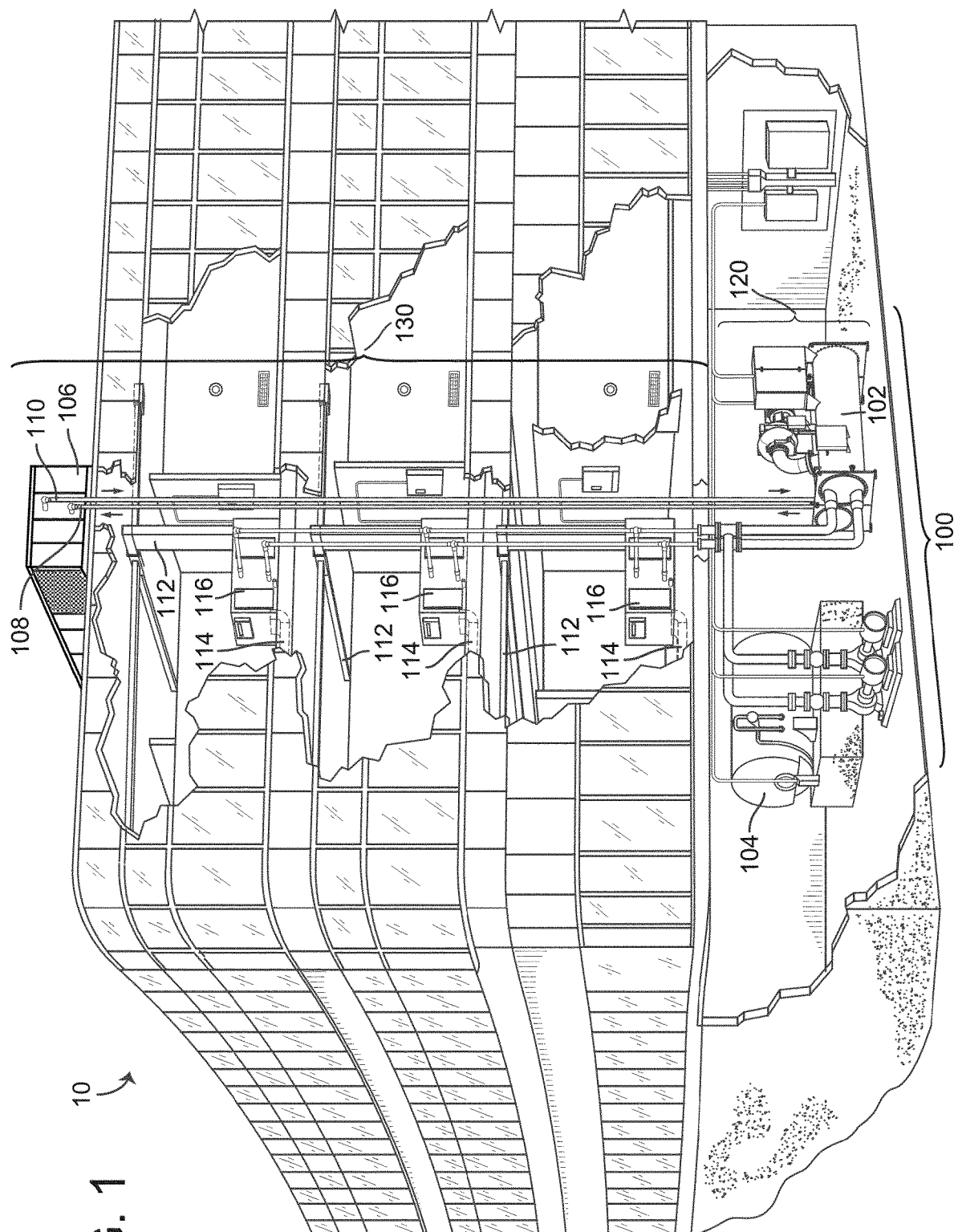
FIG. 1 is a drawing of a building equipped with an HVAC system, according to an exemplary embodiment.

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements.

AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
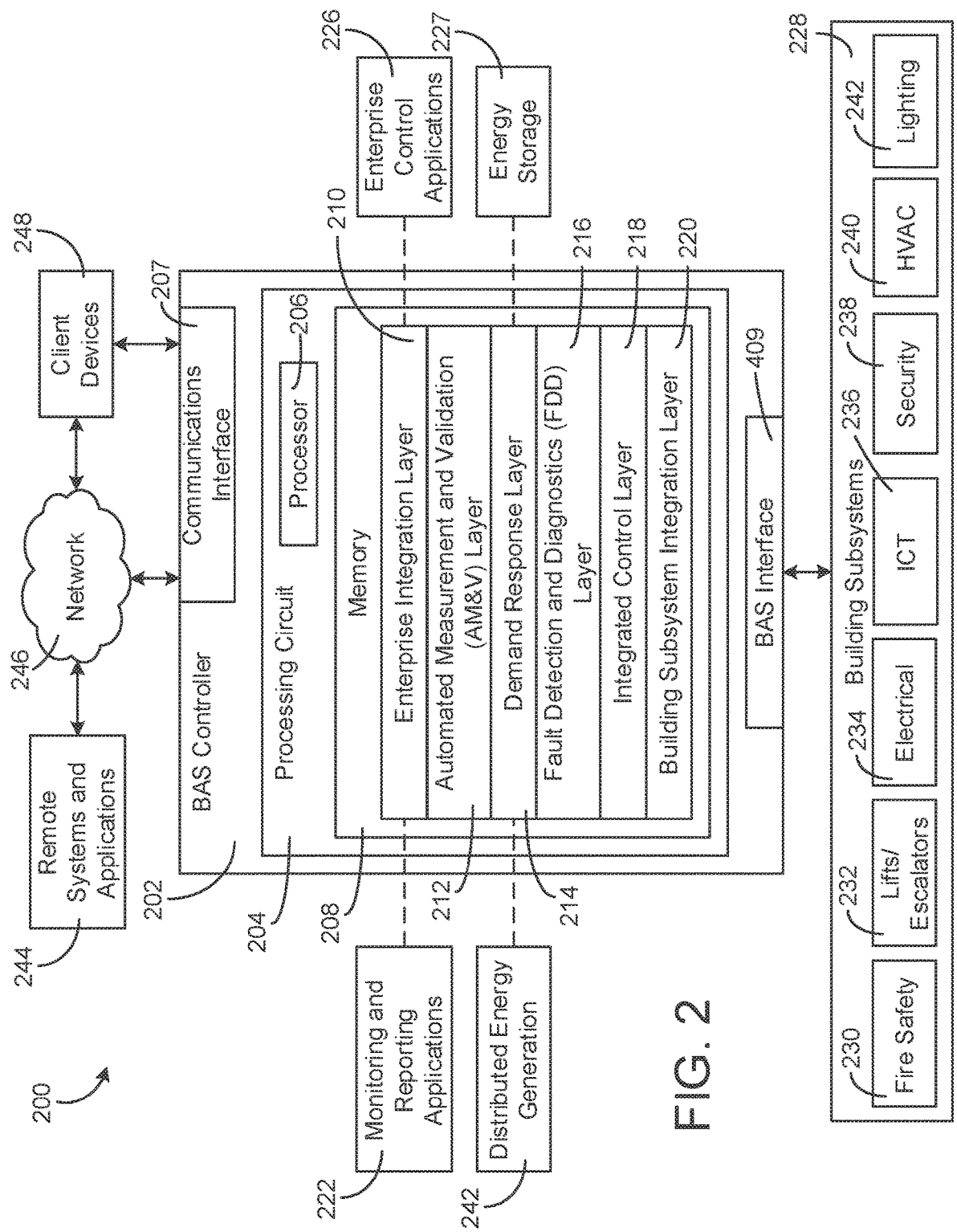
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, thermostats, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 266 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 266 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In some embodiments, BAS controller 202 is implemented within a single computer (e.g., one server, one housing, etc.). In various other embodiments BAS controller 202 can be distributed across multiple servers or computers (e.g., that can exist in distributed locations).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data source providers, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated super system. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source provider. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Building Control with Reinforcement Learning

Figure 3:
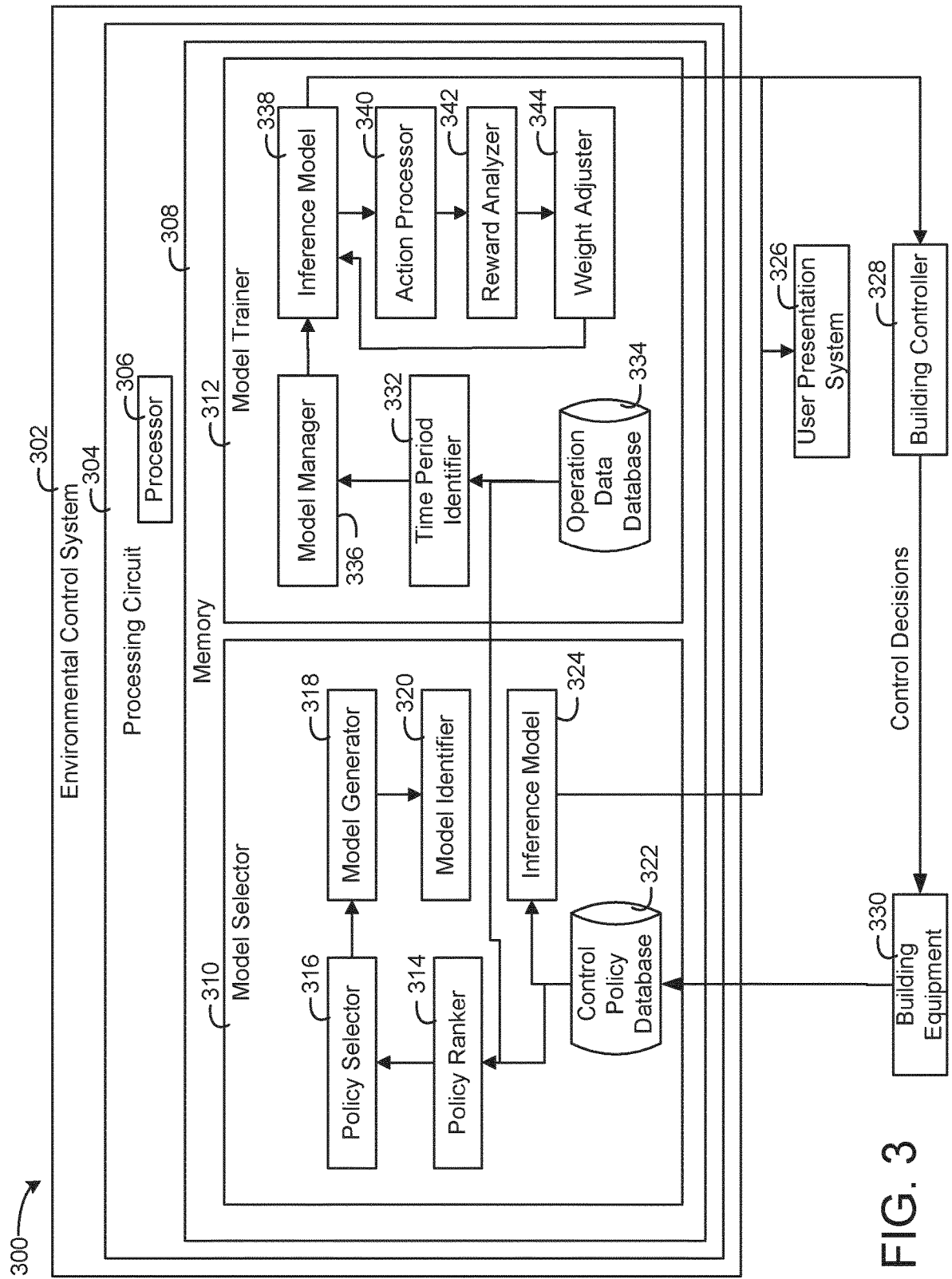
FIG. 3 is a block diagram of an environmental control system, according to an exemplary embodiment.

Referring now to FIG. 3, a block diagram of a system 300 including an environmental control system 302 that generates and trains prediction models (e.g., reinforcement learning models) to predict values for control variables or actions based on a current state of a building management system (e.g., BAS 200), according to an exemplary embodiment. Environmental control system 302 may generate a group of prediction models and select the prediction model that operates the most effectively (e.g., causes the building management system to use the least amount of energy while maintaining the comfort level of the building's occupants). Additionally, environmental control system 302 may use predetermined values for control variables for times within preset time periods to obtain values for performance variables and train a prediction model based on the obtained values. In addition to environmental control system 302, system 300 is shown to include a user presentation system 326, a building controller 328, and building equipment 330. Each of components 302 and 326-330 may communicate over a network (e.g., a synchronous or asynchronous network). Building controller 328 may be similar to or the same as BAS controller 202. Environmental control system 302 may be a component of or within building controller 328.

Environmental control system 302 may include a processing circuit 304, a processor 306, and a memory 308. Processing circuit 304, processor 306, and/or memory 308 can be the same as, or similar to, processing circuit 204, processor 206, and/or memory 208 as described with reference to FIG. 2. Memory 308 is shown to include a model selector 310 and a model trainer 312. Memory 308 may include any number of components. The model selector 310, model trainer 312, and their components are described with reference to FIGS. 3-5.

Model selector 310 can include instructions performed by one or more servers or processors (e.g., processing circuit 304), in some embodiments. In some embodiments, model selector 310 may include a policy ranker 314, a policy selector 316, a model generator 318, control policy database 322, and/or an inference model 324.

Model Trainer 312 can include instructions performed by one or more servers or processors (e.g., processing circuit 304), in some embodiments. In some embodiments, model trainer 312 can include a time period identifier 332, an operation data database 334, a model manager 336, an inference model 338, an action processor 340, a reward analyzer 342, and/or a weight adjuster 344.

As used herein, "points" or "data points" may refer to sensor inputs, control outputs, control values, and/or different characteristics of the inputs and/or outputs. "Points" and/or "data points" may refer to various data objects relating to the inputs and the outputs such as BACnet objects. The objects may represent and/or include a point and/or group of points. The object may include various properties for each of the points. For example, an analog input may be a particular point represented by an object with one or more properties describing the analog input and another property describing the sampling rate of the analog input. For example, in some embodiments, a point is a data representation associated with a component of a BMS, such as, a camera, thermostat, controller, VAV box, RTU, valve, damper, chiller, boiler, AHU, supply fan, etc.

Figure 4:
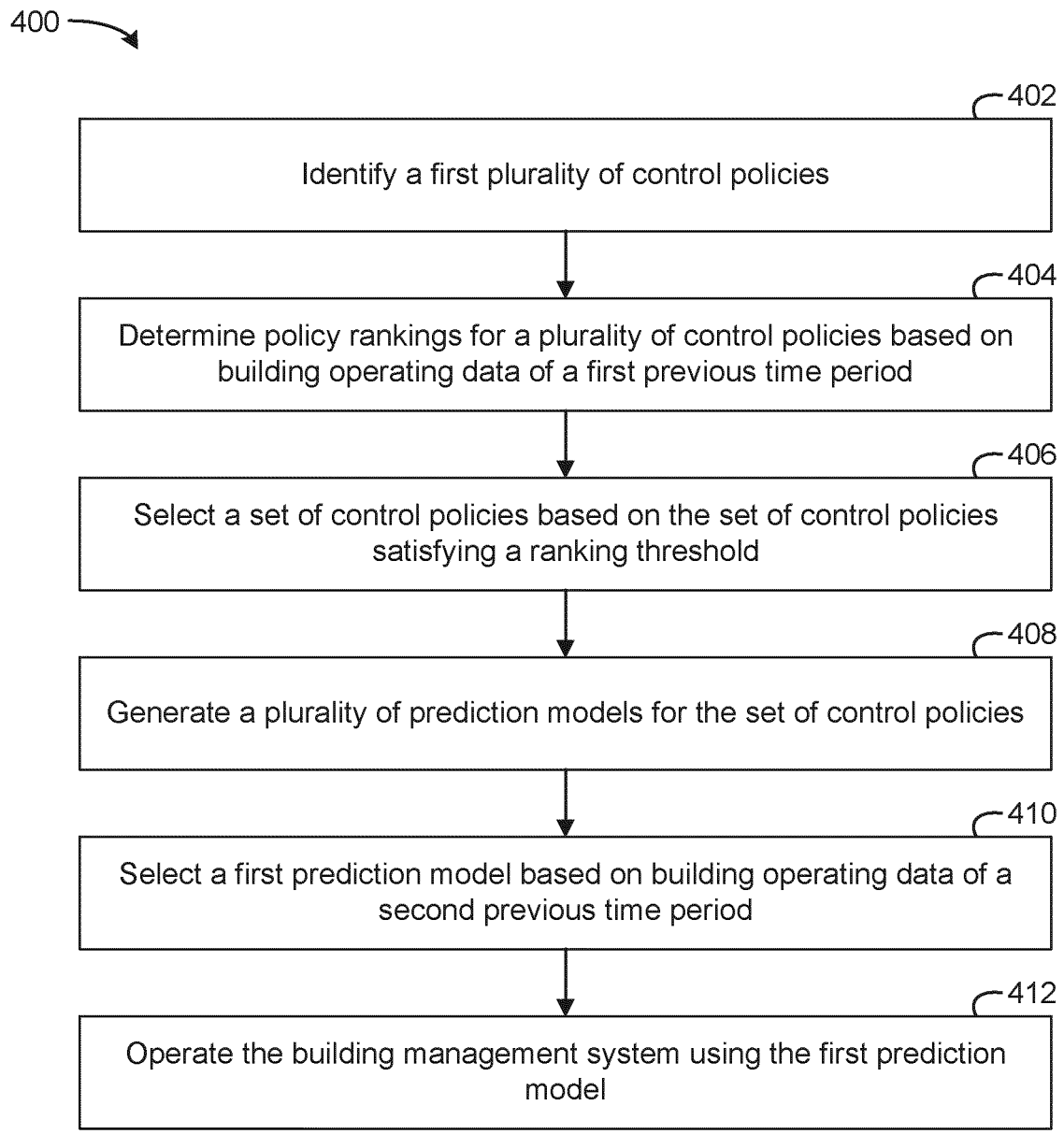
FIG. 4 is a flow diagram of a process for training a prediction model for control of a building management system, according to an exemplary embodiment.

Referring now to FIG. 4, a flow diagram of a process 400 for training a prediction model for control of a building management system is shown, according to an exemplary embodiment. Process 400 may be performed by a data processing system (e.g., environmental control system 302). Process 400 may include any number of steps and the steps may be performed in any order. At a step 402, the data processing system may identify a first plurality of control policies from a control policy database 322 which includes a repository of control policies. A control policy may be or include a number of state-spaces and/or action-spaces and a set of rules that the data processing system may use to control building equipment. Each control policy may have a different number and/or different variation of state-spaces, in some implementations. A state-space may be an environmental variable parameter such as outside air temperature, occupancy, zone-air temperature, cloudiness, etc. State-spaces may include time-step forecasts for such environmental variables. The forecasts may be obtained from outside data source providers and may be predictions for values of the environmental variables for times into the future. For example, a state-space may have a vector length of four for outside air temperatures forecasts. Such a state-space may include four outside air temperature forecasts into the future. Another state-space may include the current outside air temperature value. In some instances, the current value of the control variable may be included in the forecast state-space. Similarly, a state-space may also include a vector for a number of previous values for a particular environmental variable.

Furthermore, each control policy may have a different number or different variation of action-spaces. An action-space may be a potential action that may be performed based on values of the state-spaces. In the building management system context, for example, an action-space may be a potential zone-air temperature setpoint. Each control policy may have multiple action-spaces. For example, a first control policy may have potential zone-air temperature setpoints of 21, 22, 23, 24, 25, and 26, where 21-26 are degrees in Celsius, and a second control policy may have potential zone-air temperature setpoints of 22, 23, and 24, where 22-24 are degrees in Celsius. However, embodiments are not limited thereto, and the setpoints can be any number. The data processing system may use control policies to determine actions or values for control variables for any point of a building.

At a step 404, the data processing system may determine policy rankings, by for example the policy ranker 314, for a plurality of control policies based on building operation data, from for example the operation data database 334, of a first previous time period. The data processing system may receive building operation data (e.g., building operation data including current values, previous values, and forecasts for various points of a space of the building the data processing system in which the data processing system is operating) of a first previous time period (e.g., that is associated with a time-stamp within the first previous time period) and determine values for control variables of the building management system using each of the control policies. The data processing system may operate the building management system based on the determined values. The data processing system may determine the total energy that the building management system used (or any other performance variable such as comfortability) based on the values for the control variables and store associations between the total energy consumption values and their corresponding output values. The data processing system may maintain a count of the amount of energy each control policy used while it was implemented to operate the building management system.

The data processing system may operate the building management system using each control policy over different time periods (e.g., time periods of five or six months). For example, the data processing system may operate a first control policy from January to June and a second control policy from July to December. During each time period, the data processing system may maintain a counter indicating how much energy the building management system used. The data processing system may do so for any number of control policies and/or for time periods of any length. In some embodiments, instead of operating the building management system in real-time to determine the energy consumption of the control policies, the data processing system may perform simulations with simulated inputs into the control policies to determine how much energy the control policies caused the building management system to consume.

The data processing system may determine the total energy each control policy caused the building management system to consume while it was implemented (or during the simulation) and compare the total energies with each other. The data processing system may rank the control policies in descending order with the control policy that resulted in the least amount of energy being consumed being ranked the highest. For example, if a first control policy is associated with a total energy consumption of 5000 kWh over a fourth month period and a second control policy is associated with a total energy consumption of 6000 kWh over a four-month period, the data processing system may rank the first control policy higher than the second control policy.

In some embodiments, in addition to or instead of using energy consumption, the data processing system may rank the control policies based on a combination of state-space complexity, action-space complexity, and/or reward performance. The data processing system may determine the state-space complexity based on the number of parameters (e.g., environmental variables) that can be input into the respective control policy to determine an output. In some embodiments, a higher number of parameters is associated with a higher complexity. The data processing system may determine the action-space complexity based on the number of potential outputs or actions that the data processing system can determine using the control policy based on a set of inputs. In some embodiments, a higher number of actions may be associated with a higher action-space complexity. Overall reward performance may be any combination of energy consumption, total comfortability, total number of errors (e.g., instances in which a predicted action went outside of a preset range or threshold), etc.

The data processing system may determine policy values for a control policy based on its respective overall reward performance, state-space complexity, and/or action-space complexity. In some embodiments, higher overall reward performance is associated with a higher policy value while higher state-space and/or action-space complexity may be associated with lower policy values. The data processing system may use any rules to determine the policy values based on the overall reward performance, state-space complexity, and/or action-space complexity. The data processing system may determine policy values for any number of control policies.

The data processing system may compare the policy values of the control policies and rank the control policies in descending order. The data processing system may cause the control policies that are associated with the highest policy values to be associated with the highest rankings. The data processing system may rank any number of control policies and store associations between the ranking and the corresponding control policy in a database.

At a step 406, the data processing system may select a set of control policies, for example by the policy selector 316, based on the set of control policies satisfying a ranking threshold. The ranking threshold may be a minimum ranking that the data processing system may select. For example, the data processing system may be configured to rank 10 control policies per above. The ranking threshold may indicate that the data processing system may only select the five highest ranked control policies. Accordingly, the data processing system may select the five highest ranked control policies. In various implementations, the threshold may be a particular numerical threshold, a particular percentage of the policies, a certain number of the policies, or any other threshold.

At a step 408, the data processing system may generate a plurality of prediction models, by for example the model generator 318, for the set of control policies. To do so, the data processing system may identify the state-spaces and/or action-spaces for the control policies of the selected set of control policies. For example, for a first control policy, the data processing system may identify the current outside air temperature value and the five previous outside air temperature values as a state-space or set of state-spaces, the current cloudiness as a state-space, and/or the occupancy as a state-space. The data processing system may also identify zone-air temperature setpoints of the control policy between 21 and 24 (e.g., degrees Celsius). For a second control policy, the data processing system may identify a current outside air temperature value as a state-space and a current cloudiness value as a state-space and zone-air temperature setpoints between 21 and 25 (e.g., degrees Celsius) as action-spaces. The data processing system may identify any number of state-spaces and/or action-spaces of control policies.

The data processing system may generate prediction models such as reinforcement learning models for the set of control policies based on the identified state-spaces and action-spaces. For example, the data processing system may configure one prediction model to have the same state-spaces and action-spaces as one of the selected control policies and another prediction model to have the same state-spaces and action-spaces as another selected control policy. In some embodiments, each prediction model may have the same state-spaces and action-spaces as a corresponding control policy.

At a step 410, the data processing system may select a first prediction model, by for example the model identifier 320, based on building operation data, from for example the operation data database 334, of a second previous time period. The data processing system may implement the prediction models into the building management system separately so each prediction model may receive building operation data and output actions over time. The prediction models may be configured to receive building operation data at predetermined intervals (e.g., 15 minutes) as determined by an administrator and to make an action prediction based on the received building operation data. The data processing system may evaluate the performance of each prediction model by determining comfortability values, energy consumption values, and/or other performance variable values of the building management system based on each or a portion of the actions that the data processing used based on the output of the respective prediction model. The data processing system may do so using simulated data and/or real-time building operation data.

The data processing system may compare the performance variable values of each prediction model and identify the prediction model that is associated with the highest performance variable value. The highest performance variable value may be based on one performance variable or a combination of performance variables (e.g., total energy consumption and average comfortability). For example, the data processing system may identify and/or select the prediction model that caused the building management system to use the least amount of energy or cost the least amount of money. The data processing system may use any method to determine which prediction model is associated with the highest prediction value for selection.

At a step 412, the data processing system may operate the building management system using the first prediction model, for example the inference model 324. The data processing system may input building operation data, from for example the operation data database 334, into the first prediction model according to its state-space and/or action-space configuration. The first prediction model may use its internal weights and/or algorithms to determine an action (e.g., a control variable value) for the building management system. A controller of the building management system may receive or otherwise obtain the output and operate the building management system according to the output.

Accordingly, a method for automatic selection of state-action-spaces for a reinforcement learning agent is provided herein. The method may enable a data processing system to do so using state-spaces and/or action-spaces of known baseline policies by evaluating the performance of the control policies over time and generating prediction models based on the control policies with the highest performance. The method further enables the data processing system to select from a group of prediction models to implement the prediction model with the best performance.

Figure 5:
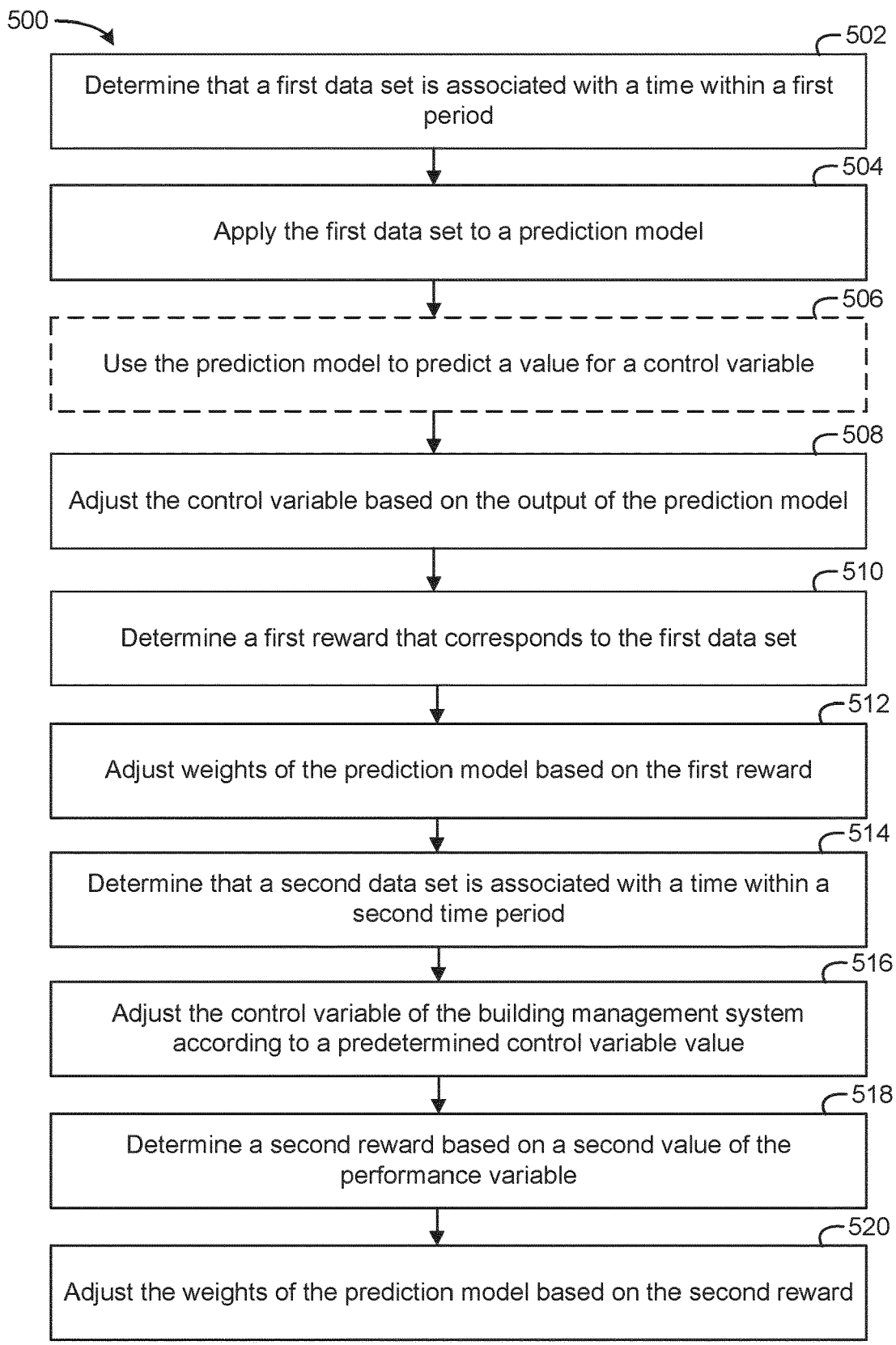
FIG. 5 is a flow diagram of a process for generating a prediction model for control of a building management system, according to an exemplary embodiment.

Referring now to FIG. 5, a flow diagram of a process 500 for generating a prediction model for control of a building management system is shown, according to an exemplary embodiment. Process 500 may be performed by a data processing system (e.g., environmental control system 302). Process 500 may include any number of steps and the steps may be performed in any order. In some embodiments, process 500 may be performed in addition to process 400 by training the selected prediction model according to the steps of process 500. At a step 502, the data processing system may determine that a first data set is associated with a time within a first time period, for example by the time period identifier 332. The data processing system may receive the first data set from building equipment of a building. In some embodiments, the data processing system may retrieve the first data set from a database that stores building operation data (e.g., the operation data database 334). The building operation data may comprise various point values that the data processing system received from various sensors of the building over time. In some embodiments, the building operation data may include forecasts for points such as outside air temperature, cloudiness, etc., that include predicted values for points for time-steps into the future. Such forecasts may be collected from an outside data source. The values of the operation data may be associated with timestamps that indicate when the values were generated by a sensor or received by the data processing system. For forecast values, the timestamps may be associated with times in which the forecasts were made or generated. The data processing system may collect such values at predetermined time intervals (e.g., 15 minutes, 30 minutes, etc.) by automatically receiving the values from the source (e.g., the outside data source or the sensor) or by polling the source at the predetermined time interval.

The data processing system may generate the first data set using the building operation data. The data processing system may do so by identifying the values for the different points of the building that are associated with the same time (e.g., have or are associated with the same timestamp). The first data set may include values for a predetermined list of points or parameters. For example, the first data set may include values that correspond to a state-space of a prediction model (e.g., a reinforcement model). The first data set may include values for points such as outside air temperature forecasts for four time-steps into the future, cloudiness forecasts for four time-steps into the future, current zone-air temperature, current humidity, current occupancy, etc. The first data set may include values for any number of points and/or any number of forecast values for each point.

The data processing system may identify the time associated with the first data set and determine whether the time is within the first time period. The first time period may be a weekly and/or daily periodic time period. The first time period may be associated with times in which a building is likely to be occupied. For example, for an office building, the first time period may be from 8 AM to 5 PM Monday through Friday. The first time period may be associated with any times or range of times as configured by an administrator. The data processing system may compare the timestamps of the data of the first data set to the first time period to determine if the first data set is within the first time period.

At a step 504, the data processing system may apply the first data set to a prediction model, for example the inference model 338. The data processing system may do so responsive to determining the first data set is within the first time period. The prediction model may be a reinforcement learning model with a list of hyper-parameters, from for example the model manager 336. In some embodiments, the prediction model may include or be a neural network with an input layer, one or more hidden layers, and an output layer, where the input layer includes state inputs to the model and the output includes nodes for different potential actions (e.g., different potential zone-air temperature setpoints). The hyper-parameters may define the prediction model by defining its inputs, possible outputs, and how the prediction model is structured. For example, the hyper-parameters may include a number of actions, a length of outside air temperature forecast vector, a length of cloudiness forecast vector, a network architecture (e.g., a number of hidden layers and/or number of nodes of each hidden layer), a batch size, an experience buffer size, a learning rate, and/or a reward scaling factor. An administrator may adjust the hyper-parameters via a user interface. In some embodiments, the hyper-parameters for the prediction model may also include a normalized power threshold for a demand charge penalty (i.e., in cases in which the prediction model takes demand charge into account when determining a correct action). The power threshold may be any value as configured by an administrator. The data processing system may apply the first data set to the prediction model to determine an output as an action (e.g., a new setpoint) for a controller to use to control the building management system.

At a step 506, the data processing system may use the prediction model, for example the inference model 338, to predict a value for a control variable. The control variable may be any point of the building (e.g., zone-air temperature setpoint, pressure setpoint, humidity setpoint, etc.). The prediction model may be configured or trained to identify a value for the control variable to minimize the electricity usage of the building management system throughout the day. In some embodiments, the prediction model may be configured to do so while minimizing the electricity costs which can be incurred based on a demand charge, total amount of electricity used, and/or time-based pricing changes that are based on peak-electricity usage across customers of the utility provider that provides the electricity. The prediction model may be trained to do so while maintaining the comfortability level of the building inside a pre-determined range. The prediction model may be trained to generate control variable outputs to "pre-cool" the building during the off-peak times and/or times in which the outside air temperature is lower or predicted to be lower in its forecast values. The prediction model may additionally or instead be trained to pre-cool the building before the occupancy of the building increases and/or the costs of doing so would be high.

The prediction model may receive the first data set as an input and identify the state of the building by identifying the values of the first data set (including any forecast values depending on the configuration of the prediction model). The prediction model may use its internal weights and algorithms to output an action (e.g., a zone-air temperature setpoint), by for example the action processor 340.

At a step 508, the data processing system may adjust the control variable based on the output of the prediction model. The data processing system may identify the output (e.g., the output action) of the prediction model and adjust the building management system accordingly. For example, the data processing system may identify a new setpoint of 23 degrees Celsius while operating at 25 degrees Celsius. The data processing system may update (or transmit instructions to a controller to update) the HVAC system (e.g., the AHU, VAV boxes, etc.) to decrease the setpoint of the building from 25 degrees Celsius to 23 degrees Celsius accordingly. The data processing system may make any adjustments to the building management system based on outputs from the prediction model. In some embodiments, the adjustments may be made to a simulated system.

At a step 510, the data processing system may determine a first reward, by for example the reward analyzer 342, that corresponds to the first data set. The data processing system may determine the first reward based on a value of a performance variable (e.g., energy expended) that was used based on the adjustment to the control variable. In one embodiment, to determine the reward, the data processing system may use the following equation:

$$\text{Reward} = E - \frac{\lambda}{(C - \text{total current power consumption} + \text{constant})^{exponent}}$$

where E may be an electricity usage based reward, C may be the current monthly peak energy consumption, and λ may be a predetermined constant.

The Electricity Usage Based Reward may be determined based on the following equation:

$$E = -1 * \text{electricity price} * \text{power consumption}$$

Lambda, the exponent, and the constant may be predetermined values as configured by an administrator. E may be the electricity usage based reward and C may be the current monthly peak energy consumption. The data processing system may retrieve the electricity price, current monthly peak energy consumption, the total current power consumption, and the power consumption from an external database or a database internal to the data processing system. The reward may be configured to reward actions (e.g., adjustments) that lead to power consumption that is less than the current monthly peak energy consumption, while penalizing power consumption that is closer to the current monthly peak energy consumption.

In one embodiment, the data processing system may use the following equation to determine the reward:

Reward=Electricity Usage Based Reward−fixed penalty (if normalized power consumption exceeds the threshold)

The threshold and the fixed penalty may be predetermined values as configured by an administrator. In this embodiment, the reward may be configured to reward actions that may lead to normalized power consumption that does not exceed a fixed threshold.

In some embodiments, the reward may further be based on a coefficient. An equation illustrating this relationship is reproduced below:

Reward=Coefficient*(Electricity Usage Based Reward−fixed penalty) (if normalized power consumption exceeds threshold)

The coefficient may be determined based on whether the data set is associated with a peak energy consumption time or an off-peak energy consumption time. For example, the data processing system may determine a coefficient for a peak energy consumption time to be higher than a coefficient for an off-peak energy consumption time. Accordingly, the data processing system may provide higher rewards for control variable values that were determined during a peak energy consumption time than an off-peak energy consumption time.

At a step 512, the data processing system may adjust weights of the prediction model, by for example the weight adjuster 344, based on the first reward. The data processing system may use the reward as determined above and the state-spaces and action-spaces that the reward was determine based on to adjust the weights of the prediction model. The data processing system may adjust the weights proportional to the reward. For example, responsive to the prediction model outputting an output associated with a high reward, the data processing system may adjust the weights so the prediction model is more likely to predict a similar output for the same or a similar set of inputs in the future. On the other hand, responsive to the prediction model outputting an output associated with a low reward (or a penalty), the data processing system may adjust the weights so the prediction model is less likely to predict a similar output for the same or a similar set of inputs in the future. In some embodiments, outputs associated with low rewards (or penalties) may correspond to smaller adjustments than outputs associated with high rewards.

At a step 514, the data processing system may determine that a second data set is associated with a time within a second time period. The second data set may include values for the same or similar points and/or forecasts as the first data set. The second time period may be or include times that are not within the first time period. In some embodiments, the second time period may be associated with times in which a building is not likely to be occupied. For example, for a home, the second time period may include times between 12 PM and 9 PM Mondays through Thursday, 12 PM to midnight on Friday, and all day Saturday. The second time period may be associated with any times. The data processing system may collect data for the second data set similar to how the data processing system collected data for the first data set. The data processing system may determine the second data set is associated with a time within the second time period by comparing the timestamps of the data of the second data set to the second time period. In some embodiments, the first time period may be associated with off-peak electricity usage time period while the second time period may be associated with peak electricity usage time periods.

At a step 516, the data processing system may adjust the control variable of the building management system according to a predetermined control variable value. The data processing system may do so responsive to determining the second data set is associated with a time within the second time period. The predetermined control variable value may be a value stored in an action processor of the data processing system. The predetermined control variable value may be stored in any database of the data processing system. The predetermined control variable value may be configured by an administrator. In some embodiments, the predetermined control variable value may correspond to a boundary of allowable controllable variable values. For example, in some embodiments, the data processing system may be configured to only let zone-air temperature values be between 22 degrees Celsius and 26 degrees Celsius. During the summer, the data processing system may cause the predetermined control variable value to be 26 degrees Celsius and during the winter, the data processing system may cause the predetermined control variable value to be 22 degrees Celsius because the data processing system may have to do less work to heat the building during the summer and keep the building cool during the winter. The control variable values may be any value, within any boundary, and be for any control variable. The data processing system may adjust the components of the building management system based on the predetermined control variable value.

At a step 518, the data processing system may determine a second reward based on a second value of the performance variable. The data processing system may determine the second value for the performance variable (e.g., total energy consumption) by polling or retrieving data indicating the value for the performance variable once the building equipment was adjusted based on the predetermined control variable value. The data processing system may determine the second reward using methods similar to the above. At a step 520, the data processing system may adjust the weights of the prediction model based on the second reward. The data processing system may adjust the weights for the prediction model in a similar manner to the above.

Figure 6A:
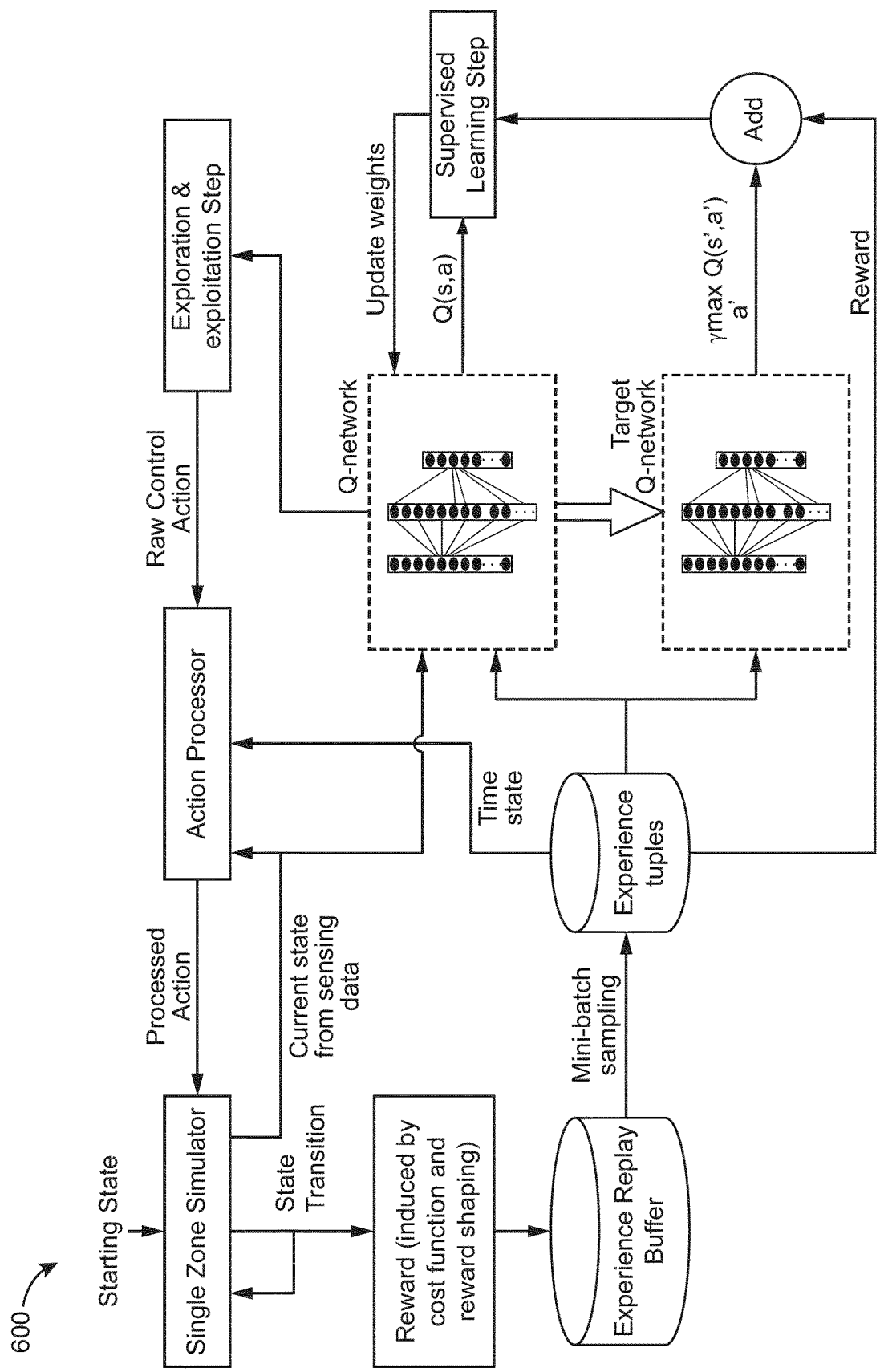
FIG. 6A is a block diagram of a reinforcement learning system, according to an exemplary embodiment.

Referring now to FIG. 6A, a block diagram of a reinforcement learning system 600 is shown, according to an exemplary embodiment. The reinforcement learning system 600 may be part of or an implementation of environmental control system 302. A prediction model of the reinforcement learning system 600 may be trained with data gathered from the first few months and stored in the experience buffer. In some instances, for a given set of hyper-parameters, it was found that the Q-learning did not always converge smoothly to know exactly when to stop the training. To get a good set of trained weights, the reinforcement learning system 600 may save ten instances of the Q-network weights at different points during the late stage of training. The reinforcement learning system 600 may choose the "best" set of weights (e.g., highest performing or weights that resulted in the best performance variable value) and deploy the model with the best set of weights for the remainder of the evaluation duration.

In some instances, to gather more exploratory data covering the state-space, data from a time period of three months or more (or any other time period) may be used, to choose random setpoints within the comfort range of 22° C. to 24° C. during occupied times and 20° C. to 26° C. during unoccupied times. Consequently, the data processing system may collect more exploratory data to help the prediction model (e.g., RL agent) learn better while at the same time potentially ensuring that the occupants are not inconvenienced too much as the data processing system maintains the setpoints within the comfort bounds.

In some embodiments, the data processing system may choose a set of weights among several sets of weights that may be expected to perform best when exposed to unseen data. This may be beneficial in a model-free RL framework, for example, because the data processing system may not have access to an external simulator or model to evaluate a set of weights against the model. In one approach, the data processing system may select the best model is to deploy a frozen set of weights for a period of 3 months and repeat this for each set of weights and pick the best performing weights for the remainder of the evaluation duration. In another approach, the data processing system could build a simple linear prediction model with the first 3 months of data and use this model to simulate an environment that can be used to select the best performing model. In another approach, the data processing system may compute the TD errors for all the experiences in the experience buffer for the different sets of weights and choose that set that contributes to the lowest sum of TD errors.

Figure 6B:
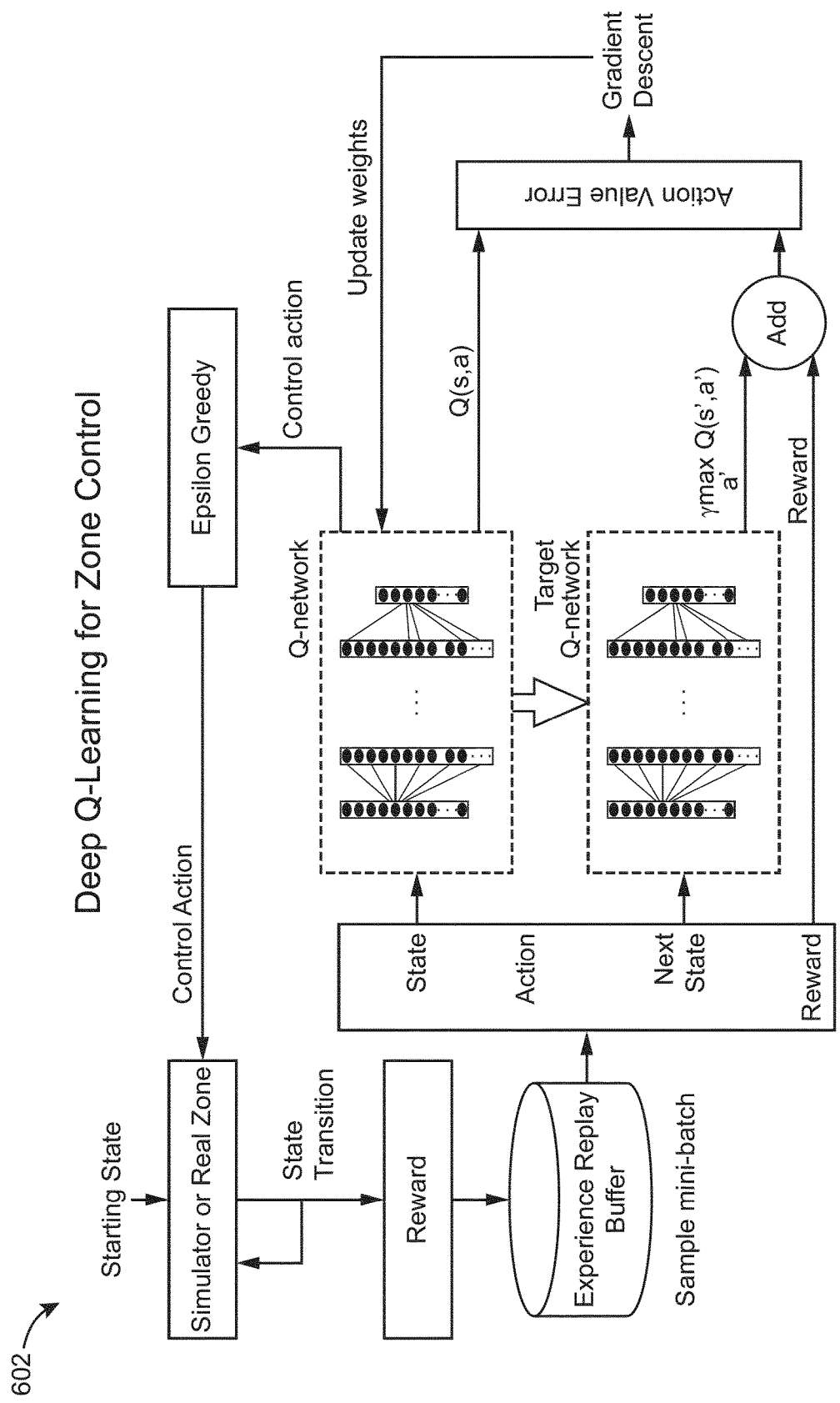
FIG. 6B is a block diagram of another reinforcement learning system, according to an exemplary embodiment.

Referring now to FIG. 6B, a block diagram of another reinforcement learning system 602 is shown, according to an exemplary embodiment. Reinforcement learning system 602 may operate similar to reinforcement learning system 600.

Figure 7:
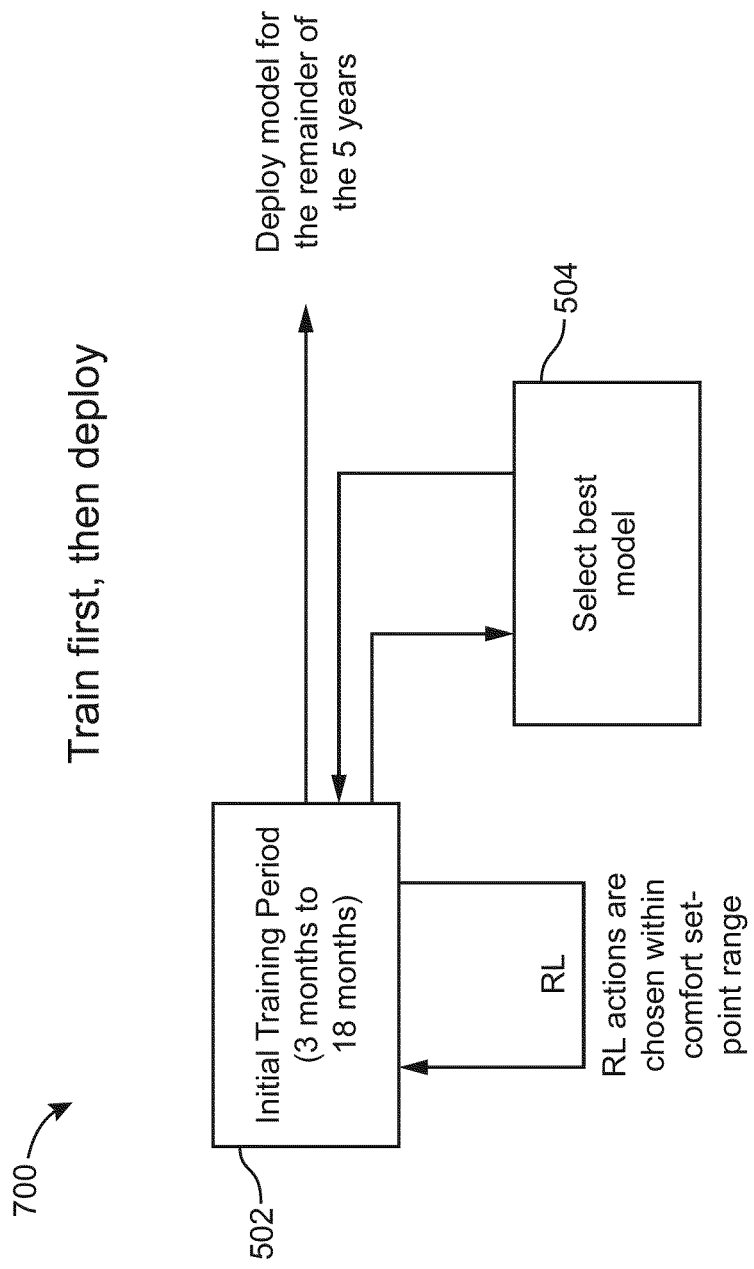
FIG. 7 is a block diagram of a model training system, according to an exemplary embodiment.

Referring now to FIG. 7, a block diagram of a model training system 700 is shown, according to an exemplary embodiment. The data processing system may train the Deep Q-Network (DQN) with data gathered from the first few months (e.g., six months to one year for the results shown in this report) and stored in the experience buffer, save ten instances of weights at different points during the training cycle, and use a model selector to choose the "best" set of weights and deploy the model for the remainder of the evaluation duration.

Figure 8:
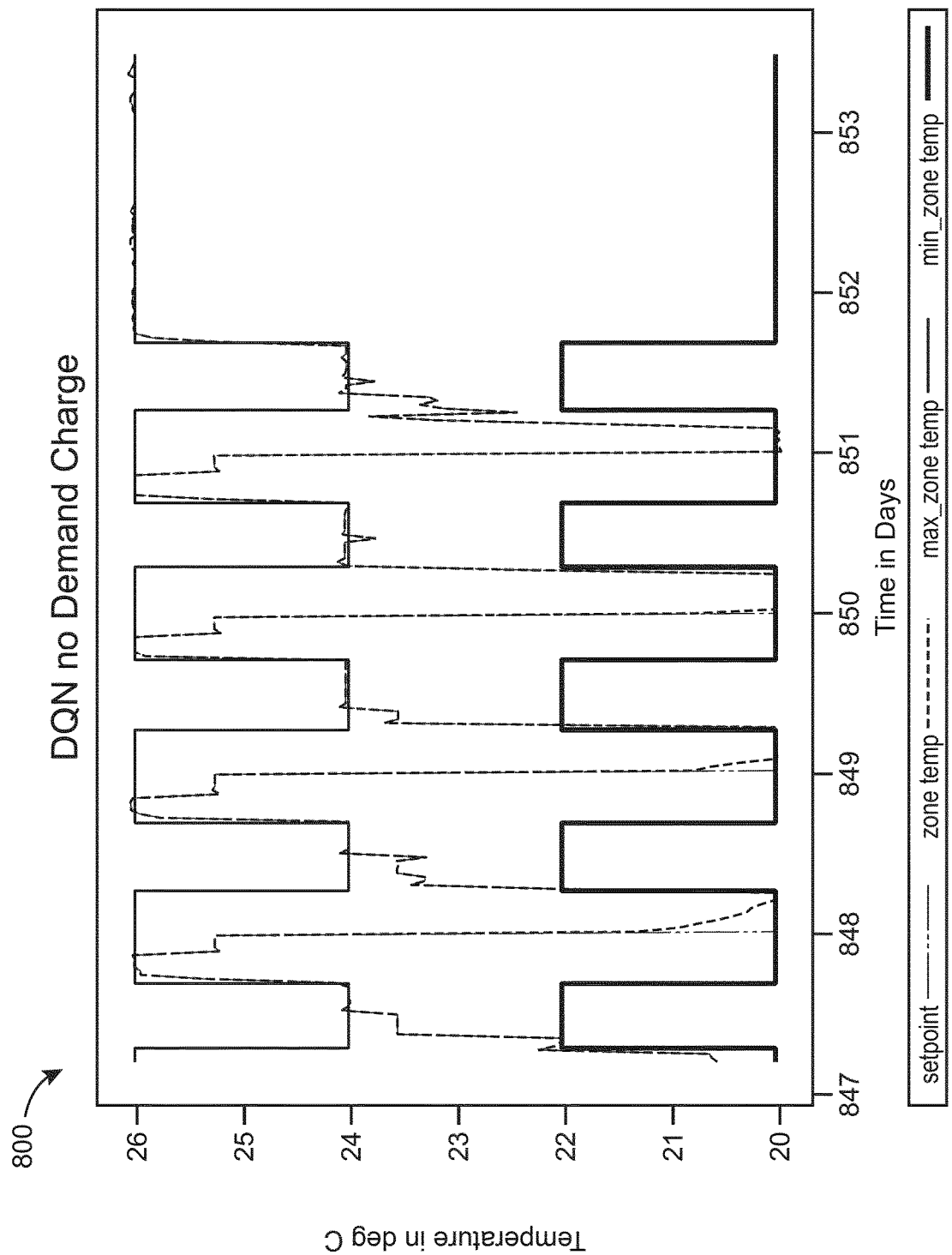
FIG. 8 is a graph of zone-air temperature of a building management system over time with no demand charge, according to an exemplary embodiment.

Referring now to FIG. 8, a graph 800 of zone-air temperature of a building management system over time with no demand charge is shown, according to an exemplary embodiment.

Figure 9:
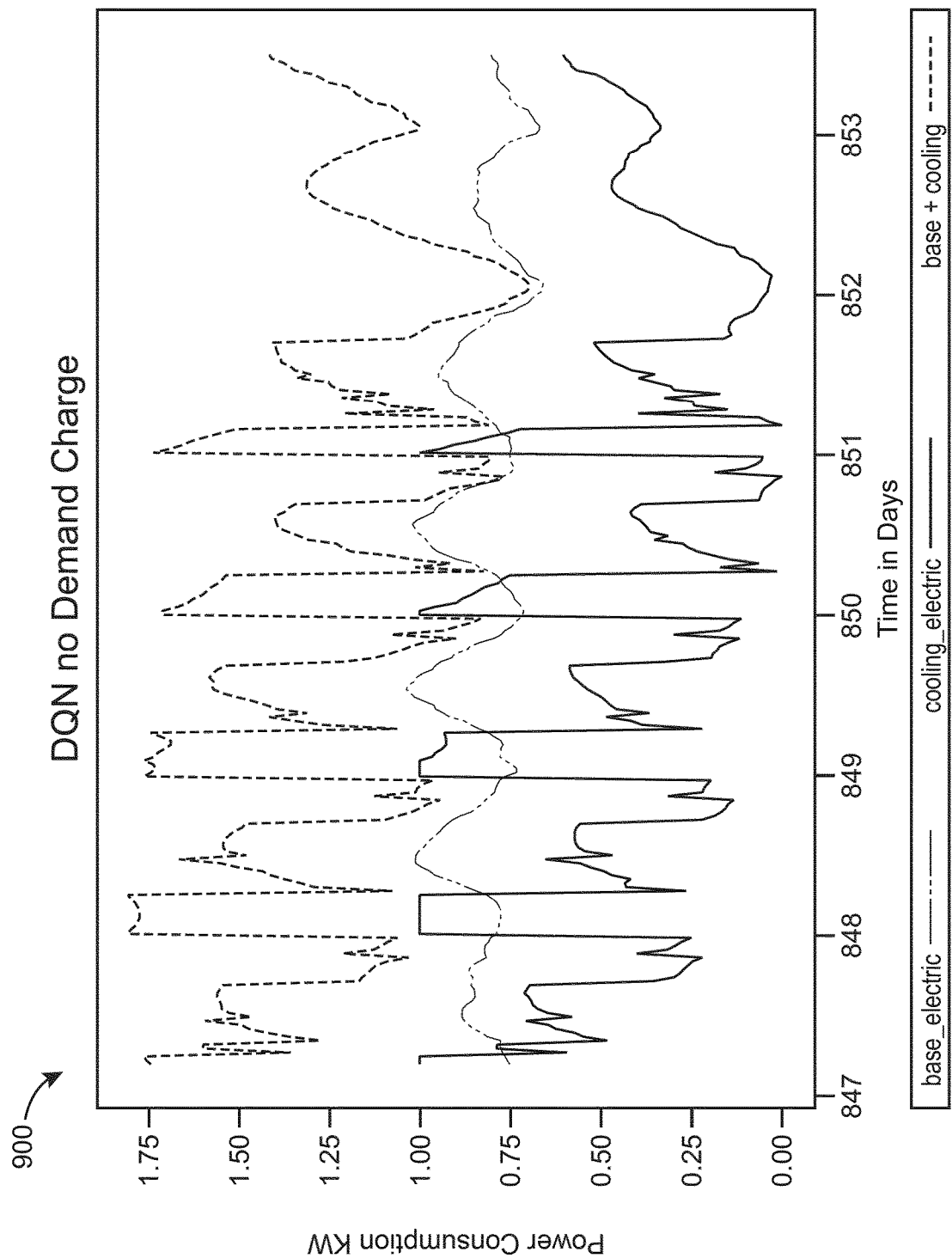
FIG. 9 is a graph of power consumption of a building management system over time with no demand charge, according to an exemplary embodiment.

Referring now to FIG. 9, a graph 900 of power consumption of a building management system over time with no demand charge is shown, according to an exemplary embodiment.

Figure 10:
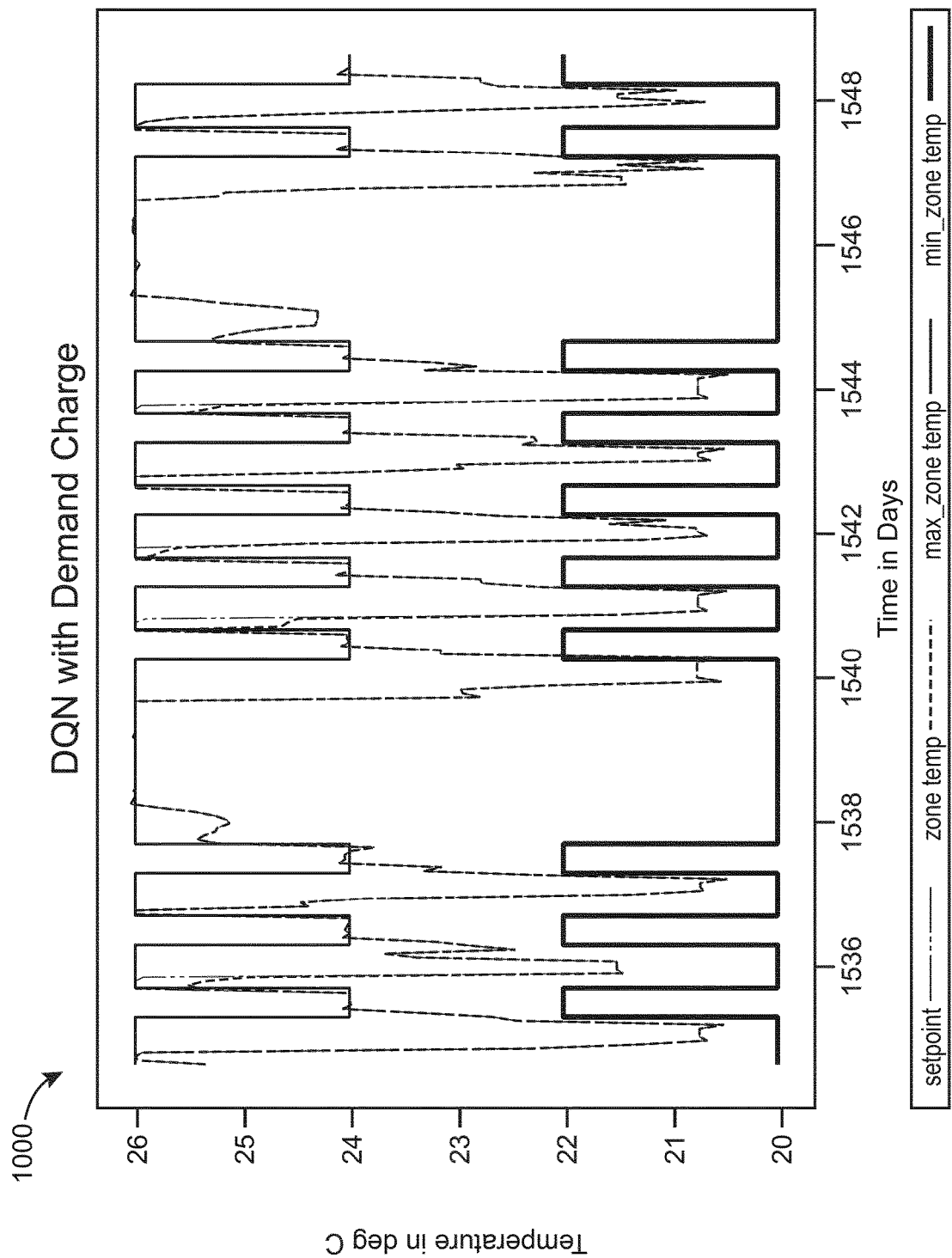
FIG. 10 is a graph of zone-air temperature of a building management system over time with demand charge, according to an exemplary embodiment.

Referring now to FIG. 10, a graph 1000 of zone-air temperature of a building management system over time with demand charge is shown, according to an exemplary embodiment.

Figure 11:
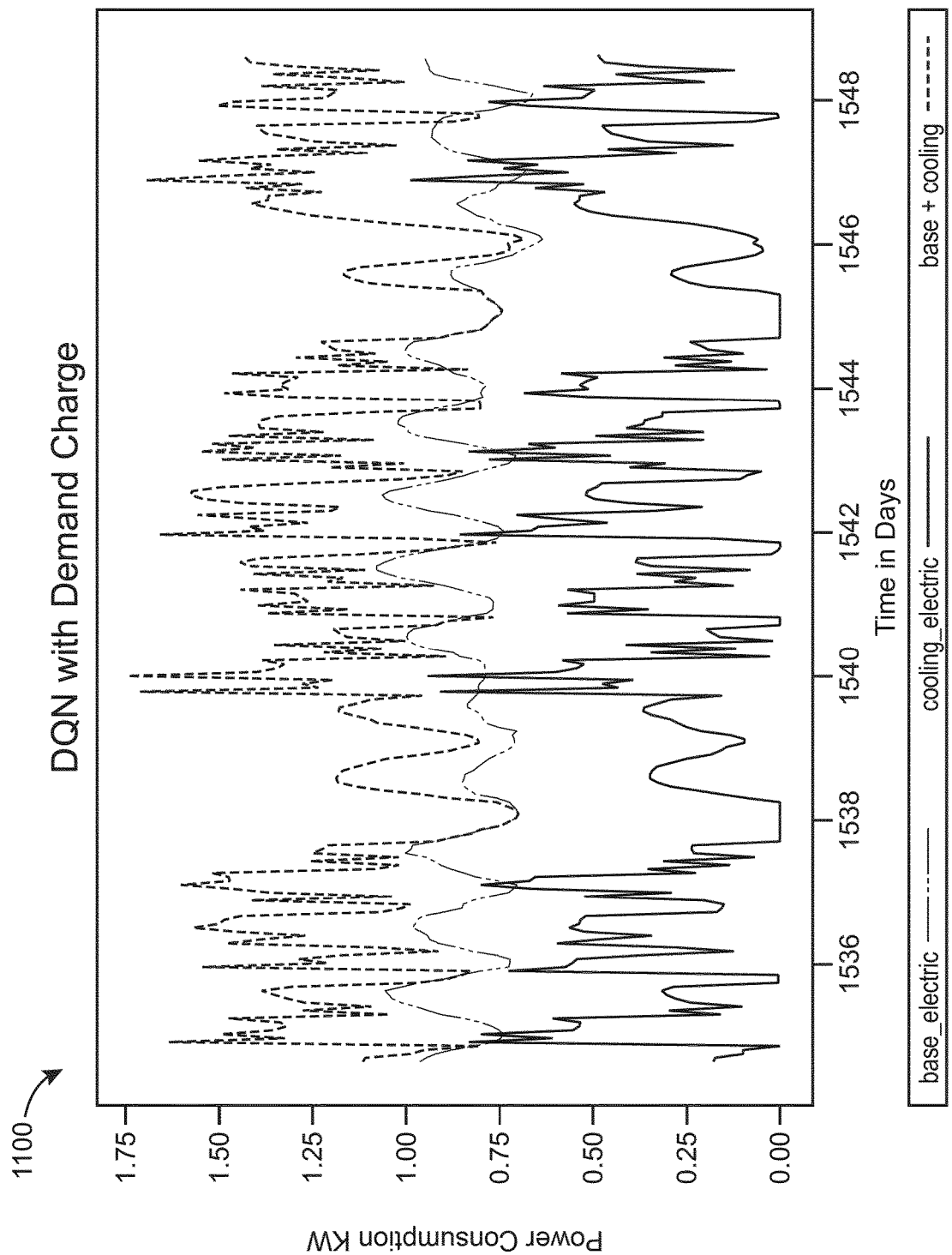
FIG. 11 is a graph of power consumption of a building management system over time with demand charge, according to an exemplary embodiment.

Referring now to FIG. 11, a graph 1100 of power consumption of a building management system over time with demand charge is shown, according to an exemplary embodiment.

Figure 12:
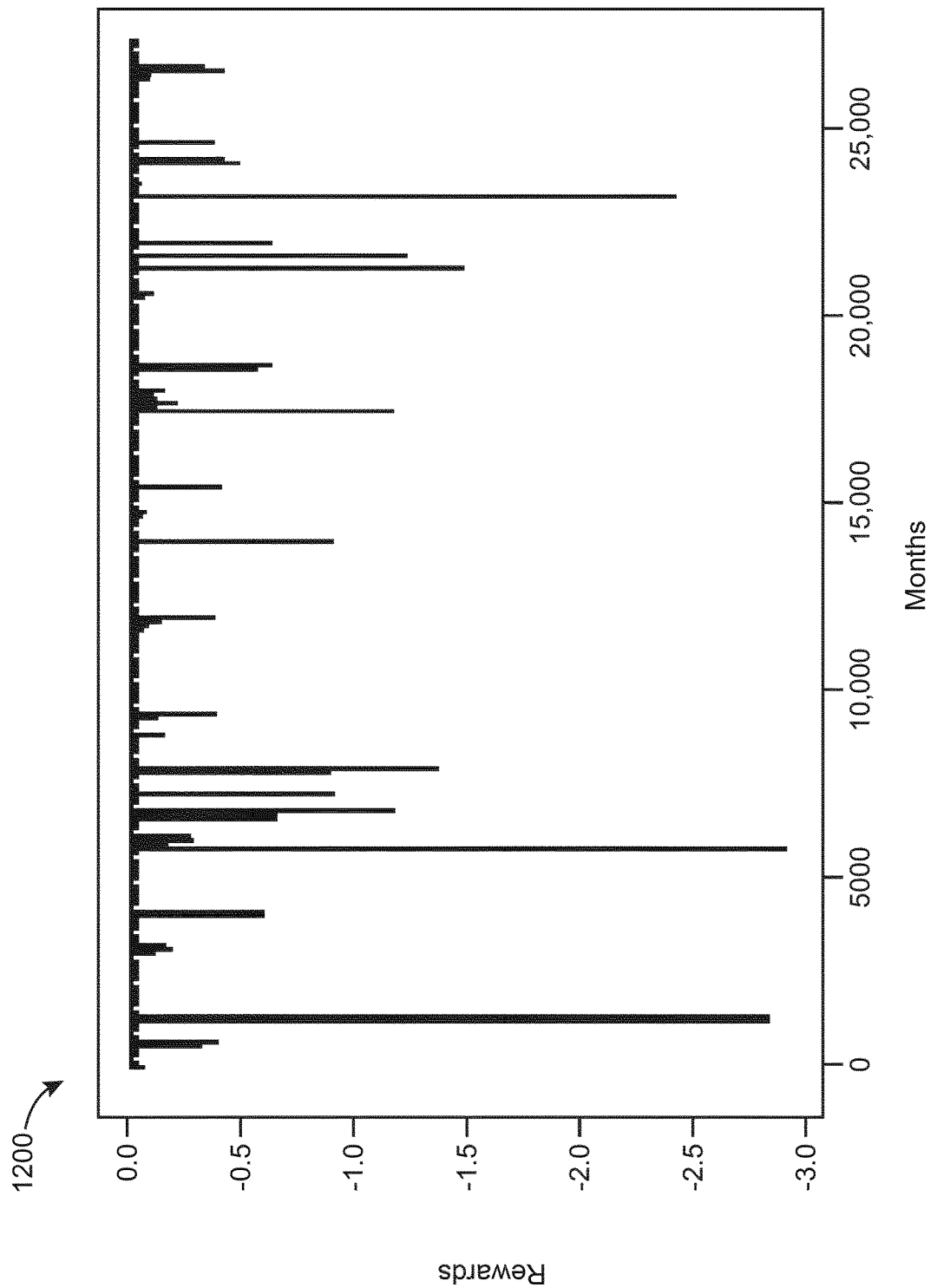
FIG. 12 is a graph of rewards for a reinforcement learning model over time, according to an exemplary embodiment.

Referring now to FIG. 12, a graph 1200 of rewards for a reinforcement learning model over time is shown, according to an exemplary embodiment.

Reinforcement Learning

A detailed description of the reinforcement learning process described above is provided below, in accordance with example implementations. Energy efficiency remains a significant topic in the control of building heating, ventilation, and air-conditioning (HVAC) systems, and diverse set of control strategies have been developed to optimize performance, including recently emerging techniques of deep reinforcement learning (DRL). While most existing systems focus on minimizing energy consumption, the generalization to energy cost minimization under time-varying electricity price profiles and demand charges has rarely been studied. Under these utility structures, significant cost savings can be achieved by pre-cooling buildings in the early morning when electricity is cheaper, thereby reducing expensive afternoon consumption and lowering peak demand. However, correctly identifying these savings requires planning horizons of one-day or more. The systems and methods described herein provide a (DQN) with an action processor, defining the environment as a Partially Observable Markov Decision Process (POMDP) with a reward function consisting of energy cost (time-of-use and/or peak demand charges) and a discomfort penalty, which may be an extension of most reward functions used in existing DRL works in this area. Moreover, the systems and methods provide for a reward shaping technique to overcome the issue of reward sparsity caused by the demand charge. The systems and methods further provide for a double DQN with a simplified state representation that includes only the time of day, which may help the agent learn more efficiently. The customized DQN described herein has been shown to outperform baseline rule-based policies by saving around 6% of total costs.

Furthermore, commercial buildings have been found to account for over 20% of the total energy consumption in the U.S. Particularly, about 40% to 50% of such consumption may be mainly attributed to the heating, ventilation, and air-conditioning (HVAC) systems. Thus, energy efficiency remains a significantly critical topic and effective control and maintenance strategies for operating HVAC systems. Traditionally, simple rule-based and feedback controls such as on-off control or PID control have been used to control the indoor environment based on different time and occupancy schedules. However, these two categories of controllers may result in sub-optimal performance due to lack of predictive information on external disturbances such as weather and occupancy.

Systems that do not use the methods described herein may implement model predictive control (MPC) as a control strategy to tackle such issues by iteratively conducting online optimization over a receding time horizon. The performance of MPC may highly rely on the accuracy of the model as well as the robustness of the online optimization. The key challenge may be balancing the tradeoff between model accuracy and computational tractability. On the one hand, smaller linear models may be preferable for optimization as they may lead to convex optimal control problems that can be solved efficiently, but they may be unable to accurately model particular buildings. On the other hand, larger nonlinear models may accurately describe building dynamics, but optimizers tend to struggle to find globally optimal solutions to the resulting nonconvex optimal problems.

Another emerging technique that has received considerable attraction is reinforcement learning (RL), which may be a learning-based optimal control policy design method by the direct interaction with the environment. Additionally, due to the promising performance of deep learning (DL), RL has been integrated with DL to pave the way to solve the high-dimension sequential decision-making or continuous control problems such as in games, robotics and autonomous driving, which were difficult for tabular RL. While by leveraging deep reinforcement learning (DRL), many works have shown the feasible applications to the building HVAC optimal controls, the sample complexity still remains a significant issue to be addressed.

Due to the time-varying electric price profiles (with different on-peak/off-peak prices), energy cost rather than consumption has been more interesting to commercial buildings, and how to minimize it while maintaining comfort requirements may be a more challenging problem. Moreover, the cost caused by the peak electric demand, i.e., the so-called demand charge, may further increase the difficulty of the optimal controller design in building HVAC systems.

The systems and methods described herein may take into consideration practical scenarios where most key states may not be fully observable and/or the environment may be defined as a POMDP instead of an MDP. The systems provide a model-free DRL approach, a Deep Q-Network (DQN) with an action processor that enables the optimal control action in a critically safe set, given only a limited amount of historical data and a user-defined comfort bound, to minimize the time-of-use cost and demand charge. The systems also provide a reward shaping technique to overcome the issue of the reward sparsity caused by the demand charge. With a customized training method by using a model selector to choose the best weight, DQN may perform robustly and continue to improve the episodic performance on temperature regulation and cost saving and the processor to improve the control action of the building management system. The system described herein may implement a state-space simplification that includes only the time of day. The system may also adopt a double DQN algorithm that helps the agent learn more efficiently.

To evaluate the performance of the proposed DQN, a single-zone building simulation platform with a local PI controller regulating the zone temperature may be adopted accordingly as the environment of a data processing system. The data processing system may use a 5-year period (including training and testing) for the evaluation. For external disturbances, the outdoor environment generated by the typical meteorological year (TMY) data and occupancy patterns may be into account. As a supervisory controller, DQN may be a first trained offline with a limited amount of historical data and then be tested online for the rest of the period. Comparing it to the baseline method (a rule-based policy) based on the total energy cost saving to be around 6%, while performing sufficient precooling for the zone to avoid the high cost due to the on-peak price and the reduction on the monthly peak electric demand. Moreover, the data processing system may run additional simulation experiments only considering the time of day. The results of such experiments show that the double DQN with the simplified state representation may be able to outperform the DQN in terms of the cost saving as well as the learning efficiency, which implies that the definition of the system's state-space has a significant effect on performance.

Energy Cost in HVAC

By implementing the systems and methods described herein, the data processing system may minimize the energy cost while maintaining comfort requirements. The data processing system may do so while avoid the high cost caused by the peak electric demand. This problem has been recognized difficult yet practically useful since for most commercial buildings, utility companies charge their peak demands daily or monthly typically.

Preliminaries

POMDP

Model-free RL approaches may obtain their optimal control policies generically through their interaction with the environment, where the full states of the system can be provided or even determined. For example, the Markov property rarely holds in real world environments. Therefore, such a process can be represented by a POMDP, which may better capture the dynamics of the building HVAC system through only the observations of the agent that may be viewed as the partial information of the underlying system states. Specifically, it can be summarized as a 7-tuple ⟨$\Sigma$, A, T, R, $\Omega$, O, $\gamma$⟩:

S is a finite set of states
A is a finite set of actions
T is state transition probability matrix such that $T_{ss'}^{a} = P[S_{t+1}=s'|S_t=s, A_t=a]$
R is a reward function, $R_s^a = E[R_{t+1}|S_t=s, A_t=a]$
$\Omega$ is a finite set of observations
O is an observation model such that $O_{as}^o = P[O_{t+1}=o|S_{t+1}=s', A_t=a]$
$\gamma$ is a discount factor such that $\gamma \in [0, 1]$.

At an arbitrary time step t, a prediction model or agent selects an action $A_t=a$ given the current state $S_t=s$. When the action a may be executed in the environment, the current state may be transmitted to the next state $S_{t+1}=s'$ according to the state transition dynamics shown above such that the agent observes $O_{t+1}=o$. Finally, a reward $R_{t+1}=r$ may be received by the agent by using the reward function. Typically, T and R may be both unknown to the agent. The reward function may only be based on the domain knowledge. DRL aims at searching for an optimal policy that maximizes the cumulative discounted reward, i.e., return, expressed as $G_t = \Sigma_{k=0}^{\infty} R_{t+k+1}$.

DQN

Deep Q learning, as a benchmark DRL algorithm, has been adopted in different areas. The parameterized value function by a deep neural network may be called deep Q-network, which outputs the action corresponding to the maximum of Q value via updating the value function of state-action pairs. In performing the operations described herein, the data processing system may use a state value function and a state action value function. The state value function may be the expected return starting from an arbitrary state: Similarly, $V^\pi(s) = E[G_t|S_t=s]$, the state-action value function may be defined as $Q^\pi(s, a) = E[G_t|S_t=s, A_t=a]$. To derive the DQN, the optimal Q value denoted by $Q^*(s, a)$ may be defined as $Q^*(s, a) = \max_\pi E[G_t|S_t=s, A_t=a]$. The state action value function may follow the Bellman equation such that if the optimal value $Q^*(s', a')$ at the next time step was known for all possible actions a', then the optimal control policy selects the action a' that can maximize the expected value of $r + \gamma Q^*(s, a)$. Hence, one can get the following expression for the optimal state action value $$Q^*(s,a) = \mathbb{E}_{s' \sim \varepsilon}\left[+\gamma \max_{a'} Q^*(s', a') \mid s, a\right],$$

which may provide an effective estimate of the state action value function. $\varepsilon$ may represent the environment. Additionally, the iterative update of Q value can be obtained by $$Q_{t+1}(s, a) = \mathbb{E}_{s' \sim \varepsilon}\left[r + \gamma \max_{a'} Q_t(s', a') \mid s, a\right].$$

Generically, the data processing system may use some function estimators, either linear or non-linear, to estimate the state action value function, i.e., $Q(s, a; \theta) \approx Q^*(s, a)$, where $\theta$ represents the estimated parameters. In this context, the data processing system may adopt a nonlinear function estimator, deep neural network with weights θ as a Q network. To stabilize the training, the data processing system may employ a target network as used in such that the Q network can be trained by minimizing a sequence of loss functions $$L_t(\theta_t) = \mathbb{E}_{s,a \sim p(\cdot,\cdot)}\left[(y_t - Q(s, a; \theta))^2\right]$$

$$y_t = \mathbb{E}_{s' \sim \varepsilon}\left[r + \gamma \max_{a'} Q(s', a'; \theta_t^-) \mid s, a\right],$$

where $\wp(s, a)$ may be a probability distribution over state and action. Such a target work can be copied periodically from the Q network. $\theta_t^-$ may be fixed when optimizing the loss function $L_t(\theta_t)$. To obtain the gradient of $L_t(\theta_t)$ at $\theta_t$, the data processing system may differentiate the loss function and obtain the following $$\nabla L_t(\theta_t) = \mathbb{E}_{s,a \sim p(\cdot,\cdot),s' \sim \varepsilon}\left[\left(r + \gamma \max_{a'} Q(s', a'; \theta_t^-) - Q(s, a; \theta_t)\right) \nabla_{\theta_t} Q(s, a; \theta_t)\right].$$

In some embodiments, the data processing system may calculate the stochastic gradient when optimizing the loss function instead of the full expectations.

Double DQN

For the DQN algorithm, the algorithm implies that $\theta_t^- = \theta_t$ since the parameters of the target network may be copied from the online network. Thus, the max operator in DQN uses the same Q value for both selecting and evaluating an action. This can cause the selection of overestimated values, leading to the overoptimistic value estimates. To mitigate such an issue in the original DQN, the data processing system may use two value functions learned by assigning experiences randomly to update one of the two value functions, resulting in two sets of weights, $\theta_t$ and $\theta_t^-$, such that $$y_t = \mathbb{E}_{s' \sim \varepsilon}\left[r + \gamma Q\left(s', \arg\max_{a'} Q(s', a'; \theta_t), \theta_t'\right) \mid s, a\right]$$

where $\theta_t$ still plays a similar role as in DQN to estimate the value of the corresponding policy, $\theta_t'$ may be the second set of weights to evaluate the value of this policy. In this context, $\theta_t'$ can be obtained by directly using the weights from the target network. Therefore, the data processing system can still maximally leverage the original DQN and do a fair comparison, maintaining the minimal computational overhead.

Vanilla Deep Q learning algorithms (either DQN or Double DQN) may not be able to decipher the underlying states of the POMDP as in general estimating a Q value can be arbitrarily bad via an observation due to $Q(s, a; \theta) \neq Q(o, a; \theta)$. Therefore, in this context, the underlying system states may be estimated via sequences of observations such that the gap between $Q(o, a; \theta)$ and $Q(s, a; \theta)$ can be narrowed.

System Description

System Dynamics

The system described herein includes a thermal zone served by a local cooling source that may be controlled by a PI controller and a local thermostat. The thermal zone may receive heat directly from solar radiation, plug loads, and internal occupants, while exchanging heat with the ambient due to the indoor/outdoor temperature difference. In order to maintain constant zone temperature, the amount of cooling must be adjusted by a controller to counteract these heat loads. If the measured zone temperature may be above its current setpoint, the controller may increase the magnitude of cooling until the setpoint may be reached; by contrast, if the zone temperature may be below the setpoint, the controller may not be able to take any direct action and may have to wait for the zone to heat up from the disturbances.

In some instances, the air inside the zone changes temperature much faster than do the zone's solid-mass components (i.e., floor, ceiling, walls, and furniture). This timescale difference can serve as passive energy storage: if the temperature of the solid mass can be pre-cooled by lowering the zone temperature setpoint, the temperature may not need to be cooled to serve the needs of the zone's occupants.

To implement the methods described herein, the data processing system may make use of a simplified zone simulator. Internal to the data processing system, the simulator may model the zone using a second-order linear model, with one state for the (uniform) air temperature in the zone and a second state for the (uniform) temperature of the solid mass surrounding the zone (e.g., walls, floor, ceiling, and internal furniture). Both states may be subject to fixed heat loads due to solar radiation, plug loads, and internal occupants. In addition, they may exchange heat with each other and with the ambient in proportion to temperature differences. To maintain zone-air temperature, a direct cooling load may be applied to the zone-air, the magnitude of which may be controlled by a PI controller to meet the current temperature setpoint. Because the mass-temperature state evolves much more slowly than the air-temperature state, thermal energy can be passively stored by pre-cooling the solid mass, which may then provide a net cooling load to the air space over the next several hours as the mass and air temperatures slowly re-equilibrate. By implementing this simulation model, the data processing system may capture the air/mass timescale separation while also considering the dynamics of local regulatory that may be neglected by more detailed simulators.

Internally, the simulator's time-step may be $\delta=1$ min. Agents may interact with the simulator by providing a zone temperature setpoint and receiving the current observation, but this interaction loop may occur with a time-step of $\Delta=15$ min. Thus, the provided setpoints may be held constant for 15 min by the simulator, and the measurements in the observation may be averaged over the same period for consistency. The observation may include the most recent time-step's zone temperature and energy consumption, as well as forecasts (up to 48 h in length) of future ambient temperature, cloudiness, and base building electricity usage. Notably, the observation may not include values of the mass temperature or heat disturbance loads, as these quantities may not be able to be measured. Thus, the system may only be partially observed, and agents may have to infer the effect of these quantities via time correlations and the available measurements. All observed quantities may be subject to random measurement noise with variance and autocorrelation chosen to match that of typical real-world measurements.

Observations

The observation that may be used to estimate the underlying system states may include: T: zone-air temperature; $T_{out}$: outside air temperature; $p_c$: cloudiness; h: time of day; and d: day of week.

Action

The data processing system may only identify actions for a zone temperature setpoint, $T^{sp}$, which may be input to the local PI controller associated with the simplified zone.

Cost Function

The agent may maintain thermal comfort in the zone at a low energy cost. In this context, thermal comfort may be defined as maintaining zone temperature between time-varying temperature bounds $T_t^{min}$ and $T_t^{max}$ which may be set to 22° C. and 24° C. during weekdays from 7 am to 5 pm, with 20° C. and 26° C. at all other times. Due to disturbances, it may not be possible to exactly maintain these bounds, and so the data processing system may have to soften them and penalize their violation as a fictitious comfort cost $$C_{com}^t = \lambda \delta \sum_t \left( \max(T_t - T_t^{max}, 0) + \max(T_t^{min} - T_t, 0) \right)$$

in which $T_t$ may be the zone-air temperature (with t representing the simulator's time-step), and $\lambda=0.1\$/°$ Ch.

Energy cost may be calculated on a monthly basis as the sum of use charges and peak demand charges. Use charges may be given by $$C_{use}^t = \delta \sum_t p_t W_t$$

in which $p_t$ may be the (known) time-varying electricity price (in $/kWh) and $W_t$ may be the average building electric power (in kW) over time period t. The peak demand charge may then be calculated as $$C_{dem}^t = p_D \max_t \left( \frac{1}{15} \sum_{t'=t}^{t+14} W_{t'} \right)$$

Here, $p_D$ may be the monthly demand price (in $/kW), and the monthly peak may be the maximum average power over any 15-minute interval in the month. Two different cases for the prices $p_t$ and $p_D$ may be as follows:

With demand charge $$p_t = \begin{cases} 0.07842 \text{ \$/kWh} & \text{weekdays 9am to 9pm} \\ 0.05622 \text{ \$/kWh} & \text{otherwise} \end{cases}$$

$p_D = 15.65$ \$/kW

Without demand charge $$p_t = \begin{cases} 0.20101 \text{ \$/kWh} & \text{weekdays 9am to 9pm} \\ 0.09137 \text{ \$/kWh} & \text{otherwise} \end{cases}$$

$p_D = 0$ \$/kW

The first case may incentivize load flattening (via the demand charge), while the second case may more strongly incentivize load shifting.

As an extra source of complication, the total building power may be calculated as $W_t = \eta q_t + W_t^0$ in which $q_t$ may be the zone cooling load, which may be (indirectly) controllable by the agent, and $W_t^0$ may be the base electricity load of the building due to lighting and plug loads, which may be constant regardless of the agent's actions. Note that $\eta$ may be a scale factor (i.e., the inverse of coefficient of performance) to convert from thermal cooling load to the corresponding electricity consumption, and it may be assumed to be constant for simplicity. For the use charge, the $W_t^0$ term may not matter very much because it increases the monthly use charge by a fixed amount. However, for the demand charge, the term may provide extra flexibility, because the agent can fill in the nightly troughs of $W_t^0$ with additional $q_t$ without increasing the overall demand charge. The data processing system may compute $q_t$ by subtracting the hypothetical monthly electricity cost assuming constant $q_t \equiv 0$.

Rule Based Policies

To assess the performance of the RL policies, the data processing system may compare to two rule-based policies that may correspond to a fixed weekly set-point schedule. The first policy may attempt to minimize instantaneous energy consumption at all times by keeping the setpoint as high as possible, with some minor dynamic adjustments to avoid comfort violations. The schedule may be generated as follows, with t representing the slower agent time-step (i.e., $\Delta=15$ min):

Calculate the target setpoint $T_t^*:=\min_{t'=t, \ldots, t+3} T_{t'}^{max}$.

If $T_t^* \leq T_{t-1}^{sp}$, set $T_t^{sp}=T_t^*$; otherwise, set $T^{sp}=(T_{t-1}^{sp}+T_t^*)/2$ Here, the target setpoint $T_t^*$ may give the most stringent upper comfort limit over the next hour. If this target is lower than the previous setpoint, the policy may step immediately to the target to ensure the system has sufficient time to reach it. However, if the target is higher than the previous setpoint, the setpoint may be increased only halfway to the target, which may avoid comfort violations due to controller overshoot, which could occur if the setpoint were increased directly to the target. The "Baseline" policy may be largely representative of typical building operation, with minor additional complexity to avoid comfort penalties (which would complicate cost analysis).

Because the previous baseline policy may make no attempt to leverage peak/off-peak electricity price difference, An alternative algorithm may be used. The algorithm may be as follows:

If $\rho_t$ is at its high value, set the target setpoint to $T_t^*:=\min_{t'=t, \ldots, t+3} T_{t'}^{max}$; otherwise, set the target setpoint to $T_t^*:=\max_{t'=t, \ldots, t+3} T_{t'}^{min}$ Set the setpoint to $T_t^{sp}:=0.65T_t^*+0.35T_{t-1}^{sp}$ In words, when electricity is cheap, the data processing system may move the setpoint towards its lowest comfortable value, while when electricity is expensive, the data processing system may move the setpoint to its highest comfortable value. This policy may cause the mass temperature to be significantly reduced overnight, thus reducing the cooling load needed to maintain a comfortable air temperature during the day by serving as a heat sink. The data processing system may refer to this policy as "Aggressive Pre-Cooling," as it may represent the maximum possible amount of pre-cooling without violating comfort bounds.

While DRL may be a very powerful general paradigm to learn to look ahead and try to maximize future rewards, the current training algorithms and techniques may be in practice constrained by lack of availability of large amount of training samples (that span across different states and actions), imperfect reward assignment schemes (assigning appropriate rewards and penalties for actions taken in different states) and the length of the reward horizon (the longer the horizon, the less effect a future reward has on the Q-network's learning in the current state).

The data processing system may address this technological problem for HVAC control deployment. In some applications of RL, hundreds of thousands, if not millions of samples may be used to train the Q-network. One way to get this amount of data samples may be to build a good model of the building and extract samples to train. However, this method may not be scalable and may be hard to deploy across building. Thus, by implementing the systems and methods provided herein, the data processing system may create training data sets assuming constant setpoint measurements (conventional rule-based setpoint values) for a two-month period (or any time period), followed by the above mentioned one month of random setpoint exploration. After the third month, the data processing system may incur high cost penalties to the applicable agent or prediction model.

Customized DQN

The DQN may implement an action processor to train the Network. The action processor may require the time information (e.g., weekday or weekend, morning or afternoon) to process the raw action delivered by the Q-network in either the training or testing phase. For the Q-network model, as the convergence of deep Q learning algorithm still remains an open problem, the data processing system may use a model selector to obtain the best weights. Reward shaping may be mainly developed to overcome the issue of reward sparsity caused by the demand charge due to its monthly signal.

Action Processor

Given the limited amount of data available and other constraints mentioned above regarding training DRL, it becomes important to utilize any prior information that may be available to try to improve the performance of the Q network. The prior information taken into account to facilitate the learning consists of more peak hours appearing when the electric price is high and those times to allow trivially setting temperature setpoints to upper comfort bounds, which motivates the development of an action processor. Let $a_t$ denote the raw control action output by the agent at time step t. By combining the baseline policy and denoting the processed action as $\hat{a}_t$, $\hat{a}_t$ may be set to $T_t^{sp}$ for times that will be specified in experiments; otherwise $\hat{a}_t=a$. This action processor can be used both while training the Q-network as well as during inference.

Reward Shaping

According to the cost function shown, the reward (negative cost) comprises three parts, the comfort cost $C_{com}^t$, use charge $C_{use}^t$, and demand charge $C_{dem}^t$, for each time step t. The demand charge corresponds to the peak power consumption at any time during a month. Since this may be a rare occurrence, coming up with a reward scheme for an RL agent to learn to penalize this demand charge may be difficult. The reward scheme has to penalize this rare charge while encouraging actions that lead to lower power consumption. FIG. 12 illustrates an instance plot for the reward signal for nine consecutive months and the spikes in it correspond to the times when the demand charge term may be dominant. In some instances, associating a reward that penalizes just this one spike may be not enough to make the RL agent learn well to reduce the demand charge. Thus, a few other few reward shaping techniques may be used, including prioritized experience replay, dual-experience replay buffers, reward-valley-penalize-peak, and reward-below-threshold. Different techniques can lead to different performance improvement and the reward-below-threshold approach may enable the most significant improvement over the baseline method. Intuitively, it may be to reward the actions that would lead to normalized power consumption that does not exceed a fixed threshold, which can be expressed $$r=-(\zeta(C_{com}^t+C_{use}^t)+c1(\Delta W_{t,nor}))$$

Where $\zeta$ may be a scaling factor, c may be the pre-defined large penalty constant, $1(\Delta W_{t,nor})$ may be an indicator function such that if $\Delta W_{t,nor}>0$, $1(\Delta W_{t,nor})=1$; if $\Delta W_{t,nor}\leq 0$, $1(\Delta W_{t,nor})=0$, $\Delta W_{t,nor}=W_{t,nor}-\overline{W}_{nor}$, $W_{t,nor}$ may be the normalized demand or power consumption, and $\overline{W}_{nor}$ may be the threshold.

Model Selector

To get a good set of trained weights for the Q-network, the data processing system may use a model selector to choose the "best" set of weights obtained during the training phase and deploy the model in the evaluation phase. This may be because the deep Q learning did not always converge smoothly and know exactly when to stop the training. Due to lack of theoretical foundation, such a topic has rarely been investigated in different applications of deep Q learning. The role of a model selector may be to choose a set of weights among several sets of weights that may be expected to perform best when exposed to unseen data. One can leverage different schemes to achieve that, depending on various scenarios. In this paper, empirically, the data processing system may select the best model using an instance of the simulator and evaluating the different set of weights on this simulated environment.

Simulation Experiment

Simulation Testbed

The data processing system may make use of a simplified zone simulator developed for this work. Internally, the simulator may model the zone using a second-order linear model, with one state for the (uniform) air temperature in the zone and a second state for the (uniform) temperature of the solid mass surrounding the zone (e.g., walls, floor, ceiling, and internal furniture). Both states may be subject to fixed heat loads due to solar radiation, plug loads, and internal occupants. In addition, they exchange heat with each other and with the ambient in proportion to temperature differences. To maintain zone-air temperature, a direct cooling load may be applied to the zone-air, the magnitude of which may be controlled by a PI controller to meet the current temperature setpoint. Because the mass-temperature state evolves much more slowly than the air-temperature state, thermal energy can be passively stored by pre-cooling the solid mass, which will then provide a net cooling load to the air space over the next several hours as the mass and air temperatures slowly re-equilibrate. Although this simulation model may be simple, by using the simulation model, the data processing system may capture the air/mass timescale separation while also considering the dynamics of local regulatory that may be neglected by more detailed simulators. In addition, its simplicity allows actions to be computed by means of a convex optimization problem, which may provide valuable insight into how and to what extent energy cost can be reduced.

Internally, the simulator's time-step may be S=1 min. Agents interact with the simulator by providing a zone temperature setpoint and receiving the current observation, but this interaction loop occurs with a time-step of Δ=15 min. Thus, the provided setpoints may be held constant for 15 min by the simulator, and the measurements in the observation may be averaged over the same period for consistency. The observation may include the most recent time-step's zone temperature and energy consumption, as well as forecasts (up to 48 h in length) of future ambient temperature, cloudiness, and base building electricity usage. Notably, the observation may not include values of the mass temperature or heat disturbance loads, as, in some instances, these quantities cannot be measured. Thus, the system may only be partially observed, and agents may have to infer the effect of these quantities via time correlations and the available measurements. All observed quantities may be subject to random measurement noise with variance and autocorrelation chosen to match that of typical real-world measurements.

Observations

The observations that may be used to estimate the underlying system states include: T: zone-air temperature; Tout: outside air temperature; pc: cloudiness; h: time of day; d: day of week.

Action

In some embodiments, the only action the data processing considers may be zone temperature setpoint, $T^{sp}$, which may be input to the local PI controller associated with the simplified zone.

Cost Function

The overall goal of each agent may be to maintain thermal comfort in the zone at the lowest energy cost. In this context, thermal comfort may be defined as maintaining zone temperature between time-varying temperature bounds $T_t^{min}$ and $T_t^{max}$, which may be set to 22° C. and 24° C. weekdays 7 am to 5 pm, with 20° C. and 26° C. at all other times. Due to disturbances, it may not be possible to exactly maintain these bounds, and so the data processing system may soften them and penalize their violation as a fictitious comfort cost $$C_{com}^t = \lambda \delta \sum_t \left( \max(T_t - T_t^{max}, 0) + \max(T_t^{min} - T_t, 0) \right)$$

in which $T_t$ may be the zone-air temperature (with t representing the simulator's time-step), and $\lambda$=0.1 $/° Ch.

Energy cost may be calculated on a monthly basis as the sum of use charges and peak demand charges. Use charges may be given by $$C_{use}^t = \delta \sum_t p_t W_t$$

in which $p_t$ may be the (known) time-varying electricity price (in $/kWh) and $W_t$ may be the average building electric power (in kW) over time period t. The peak demand charge may be then calculated as $$C_{dem}^t = p_D \max_t \left( \frac{1}{15} \sum_{t'=t}^{t+14} W_{t'} \right)$$

Here, $p_D$ may be the monthly demand price (in $/kW), and the monthly peak may be the maximum average power over any 15-minute interval in the month. In some instances, the following two cases for the prices and $p_D$ may be used:

With demand charge $$p_t = \begin{cases} 0.07842 \text{ \$/kWh} & \text{weekdays 9am to 9pm} \\ 0.05622 \text{ \$/kWh} & \text{otherwise} \end{cases}$$

$p_D = 15.65$ $/kW

Without demand charge $$p_t = \begin{cases} 0.20101 \text{ \$/kWh} & \text{weekdays 9am to 9pm} \\ 0.09137 \text{ \$/kWh} & \text{otherwise} \end{cases}$$

$p_D = 0$ $/kW

The first case may generally incentivize load flattening (via the demand charge), while the second case may more strongly incentivize load shifting.

As an extra source of complication, the total building power may be calculated as $W_t = \eta q_t + W_t^0$ in which $q_t$ may be the zone cooling load, which may be (indirectly) controllable by the agent, and $W_t^0$ may be the base electricity load of the building due to lighting and plug loads, which may be constant regardless of the agent's actions. Note that $\eta$ may be a scale factor (i.e., the inverse of coefficient of performance) to convert from thermal cooling load to the corresponding electricity consumption, and may be assumed to be constant for simplicity. For the use charge, the $W_t^0$ term may not matter very much, as it simply increases the monthly use charge by a fixed amount. However, for the demand charge, the term provides extra flexibility, as the agent can fill in the nightly troughs of $W_t^0$ with additional $q_t$ without increasing the overall demand charge. Note, however for the purposes of analysis, the data processing system may only use the cost associated with the controllable action $q_t$, which may be computed by subtracting the hypothetical monthly electricity cost assuming constant $q_t$=0.

Rule-Based Policies

To assess the performance of the RL policies, the data processing system may compare two simple rule-based policies that correspond to a fixed weekly set-point schedule. The first policy may attempt to minimize instantaneous energy consumption at all times by keeping the setpoint as high as possible, with some minor dynamic adjustments to avoid comfort violations. The schedule may be generated as follows, with representing the slower agent time-step (i.e., $\Delta$=15 min):

Calculate the target setpoint $T_t^* := \min_{t'=t,\ldots,t+3} T_{t'}^{max}$.

If $T_t^* \leq T_{t-1}^{sp}$, set $T_t^{sp} = T_t^*$; otherwise, set $T^{sp} = (T_{t-1}^{sp} + T_t^*)/2$ Here, the target setpoint $T_t^*$ gives an upper comfort limit over the next hour. If this target may be lower than the previous setpoint, the policy steps immediately to the target to ensure the system has sufficient time to reach it. However, if the target is higher than the previous setpoint, the setpoint may be increased only halfway to the target, which avoids comfort violations due to controller overshoot, which could occur if the setpoint were increased directly to the target. This may be a "Baseline" policy, as it may be largely representative of typical building operation, with minor additional complexity to avoid comfort penalties.

Because the previous baseline policy makes no attempt to leverage peak/off-peak electricity price difference, the data processing may instead use the following algorithm:

If $\rho_t$ is at its high value, set the target setpoint to $T_t^* := \min_{t'=t, \ldots, t+3} T_{t'}^{max}$; otherwise, set the target setpoint to $T_t^* := \max_{t'=t, \ldots, t+3} T_{t'}^{min}$ Set the setpoint to $T_t^{sp} := 0.65 T_t^* + 0.35 T_{t-1}^{sp}$ In words, when electricity is cheap, the data processing system may move the setpoint towards its lowest comfortable value, while when electricity is expensive, the data processing system may move the setpoint to its highest comfortable value. This policy causes the mass temperature to be significantly reduced overnight, thus reducing the cooling load needed to maintain a comfortable air temperature during the day by serving as a heat sink. This policy may be called "Aggressive Pre-Cooling," as it may represent the maximum possible amount of pre-cooling without violating comfort bounds.

Information Policy

As mentioned above, the relatively simple structure of the simulation model means that the data processing system can determine an optimal behavior of the system by solving an optimal control problem with knowledge of disturbances. Because the system model may be linear and the cost function may be convex, the data processing system can employ convex programming techniques to find global solutions for each month. In particular, by considering entire months within the same optimization, the peak demand charge may be perfectly managed, as the optimizer may be able to choose a single monthly peak demand target and stick to it throughout the entire month. Of course, because this policy requires values of the internal system parameters, it may not be achievable in practice. Nevertheless, it may provide key insights into problem structure to help guide tuning of other techniques and serve as an ideal benchmark to which all policies should strive. It may also provide a lower bound on system cost, which may not be available had the data processing system used a more complicated simulator.

Results

This section presents the simulation results based on the simulator described above. Specifically, the data processing system may use the zone-air temperature regulation using the proposed method and the corresponding energy consumption. Then, the data processing system can compare the proposed method with the rule-based and optimal policies in terms of energy cost savings. In addition, the effect of state-space may be empirically shown on the performance. A table for some hyperparameter settings is as follows. In Table 1, the lengths for the forecasts of $T_{out}$ and $p_c$ and $T^{max}$ & $T^{min}$ may be all 48, which signifies the number of future time steps. As each time step is 15 min the horizon for the forecast is 6 hours.

A table of the hyper-parameters that were used to generate the results is reproduced below.

| Hyper-Parameter | Value |
| --- | --- |
| Number of DQN actions | 9 |
| Length of OAT forecast vector | 48 |
| Length of Cloudiness forecast vector | 48 |
| Length of minimum zone temperature | 48 |
| Length of maximum zone temperature | 48 |
| Batch size | 128 |
| Experience buffer size | 200000 |
| Optimizer and learning rate | RMS prop, 0.0003 |
| Normalized power threshold for demand charge penalty | 0.6 |
| Reward scaling factor | 0.2 |

The number of the agent actions in the table is set to 9, which corresponds to 9 discrete values in the range between 20° C. and 26° C. for unoccupied periods and 22° C. and 24° C. for occupied periods.

Comparison

According to the problem assumption, the total simulation period may be 5 years and the limited historical data available to the data processing system for training may be three months along with only one month of exploratory data. The policy trained using this dataset may be "DQN 1". To gather more exploratory data covering the state-space, the data processing system may use data from beyond the first three months if needed to collect more exploratory data to help the RL agent learn better while at the same time attempting to ensure that the occupants may be not inconvenienced too much as building continues to stay within the comfort bounds. Hence, the data processing system can collect three more months of exploratory data such that the training data last six months with four months of exploration. This policy may be "DQN 2".

The comparison results between different methods may be listed in the table below. Using the baseline policy as the benchmark, the data processing system can determine from the table that the DQN 2 may be able to save around 6% of total energy cost and that either DQN 1 or 2 outperforms the aggressive pre-cooling policy significantly. This may be attributed to the maximum possible amount of pre-cooling without making any attempt to manage peak demand in the aggressive pre-cooling policy. In contrast, DQN policies may be able to manage reasonably well the time to pre-cool the zone in the early morning when electricity is cheaper, thereby reducing expensive afternoon consumption and lowering peak demand.

On the other hand, without taking into account demand charges, in the table below, the data processing system may determine that the aggressive pre-cooling policy outperforms the DQN 1 and such a result may not be surprising because the pre-cooling policy may consider on-peak/off-peak price differences more exhaustively than the latter. However, the DQN 1 can still maintain over 5% of total cost saving over the baseline. Another noticeable difference may be that the optimal policy saves less energy cost without demand charges, which indicates the significance of lowering peak demand as the main attribution to the total energy cost saving. A table illustrating the performance with/without demand charges during the testing phase may be shown below.

| Method | WITH | WITHOUT |
| --- | --- | --- |
| Baseline | — | — |
| Aggressive | 0.72% ± 3.20% | 11.96% ± 1.98% |
| DQN 1 | 4.93% ± 0.78% | 5.21% ± 1.75% |
| DQN 2 | 5.75% ± 0.87% | — |
| Optimal | 22.88% ± 2.70% | 16.30% ± 1.60% |

During weekends (Day 1538-1540 & 1545-1547), there may be small drops for the temperature setpoint during the unoccupied periods, which may increase moderately the power consumption. Another phenomenon may be that the temperature regulation may suffer from some unexpected noise to result in spikes in power consumption. Such agent behaviors may be caused by the unstable convergence of DQN, though they may not have a significantly negative impact on the overall control performance. One can observe that compared to the case with demand charges, the pre-cooling may be more aggressive without considering any charges on peak demand as the temperature setpoint may be directly set to the lower comfort bound, and the overall zone-air temperature regulation may be relatively easier.

Impact of Hyper-Parameters

Hyper-parameters may play a role in obtaining optimal model architectures and training performance. The hyper-parameters described herein may have been manually tuned by an administrator. The experience buffer size may be also a key factor to the final training performance as leveraging past experiences avoids oscillations or divergence in the parameters. In addition, the batch size and optimizer & learning rate have moderate impact on the DQN training with a slight improvement tuning them. The reward scaling factor and threshold may be two other hyper-parameters that may be important to the performance since they shapes the appropriate reward function in this study, especially with the presence of demand charges. A larger $\overline{W}_{nor}$ close to 1 may be difficult for the agent to reduce the peak demand. Lastly, though a larger number of agent actions enables the design of policy close to be continuous, this may not be necessary in an optimal sense with time-varying electricity prices. Since after the zone has been maintained to a comfort level, the data processing system (or the agent) may determine for the setpoint to approach the upper comfort limit to reduce energy consumption and more discrete actions increase the computational complexity.

Advantageously, the systems and methods described herein can save energy cost while maintaining the comfortability of a building compared to two practical rule-based policies.

These and other features can be found in U.S. patent application Ser. No. 17/383,213 filed Jul. 22, 2021, the entirety of which incorporated by reference herein.

Neural Network Trained Using Reinforcement Learning Model

As described above, building management systems (e.g., environmental control system 302) may strategically manage and optimize energy consumption which may lead to energy savings (and thereby operational cost savings) for a user of the system. Existing building control systems (e.g., control environments, building equipment systems, etc.) may benefit by implementing (e.g., installing, retrofitting, etc.) an environmental control system such as environmental control system 302. However, some existing building control systems may not have the hardware and data processing infrastructure supportive of the reinforcement learning methods described above. For example, utilizing a reinforcement learning method in a partially observable Markov decision process as described above is known to be a computationally intensive task, which is often implemented through the use of one or more specialized computers or network of computers. Typical building control systems may not be equipped with processors that are designed to perform a large number of computations in a reasonable amount of time. Such building control systems may rely on network based (e.g., cloud) resources. However, some building control systems may have limited internet access, which may complicate accessing network-based resources. In some embodiments, the computational intensity is particularly significant when the size of a state-space and/or action-space of a reinforcement learning model is large.

Figure 13:
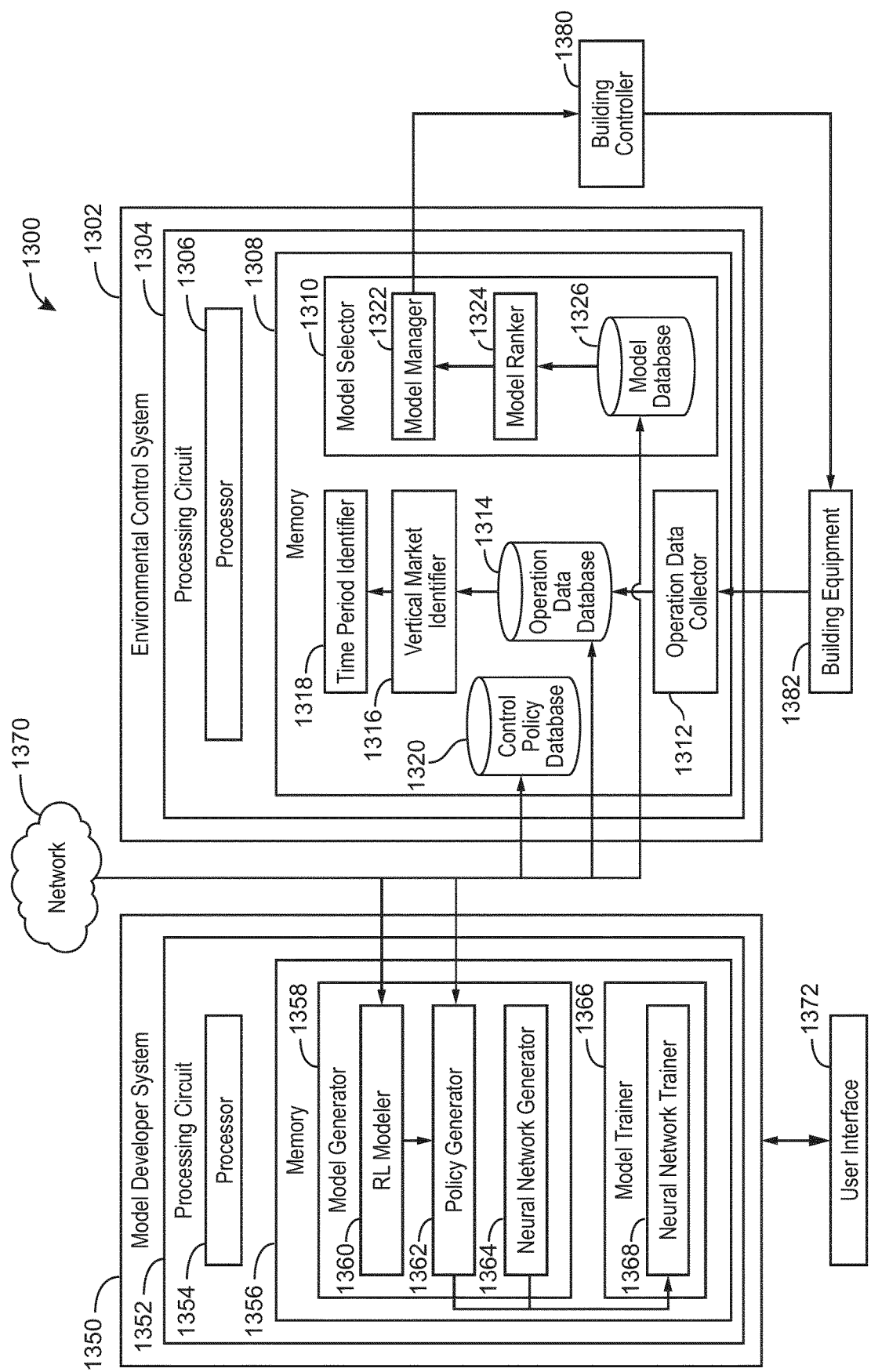
FIG. 13 is a block diagram of an environmental control system, according to an exemplary embodiment.

Referring now to FIG. 13, a block diagram illustrating a system 1300 is shown, according to some embodiments. System 1300 may generate and train prediction models (e.g., reinforcement learning models) to predict values for control variables or actions based on a current state of a building management system (e.g., BAS 200), according to an exemplary embodiment. Additionally, system 1300 may use predetermined values for control variables for times within preset time periods to obtain values for performance variables and train one or more prediction models based on the obtained values. System 1300 may include an environmental control system 1302, according to some embodiments. In some embodiments, the environmental control system 1302 has some or all of the features described with respect to the environmental control system 300. Likewise, in some embodiments, the environmental control system 300 may have some or all of the features of the environmental control system 1302.

In some embodiments, the environmental control system 1302 includes a processing circuit 1304. The processing circuit 1304 may include a processor 1306 and a memory 1308. The processor 1306 and memory 1308 may be the same as or similar to processor 306 and memory 308. For example, memory 308 may be local or remote and may include a model selector 1310 and model trainer. In some embodiments, model selector 1310 is similar to or the same as model selector 310 and may include one or more features of model trainer 312. The memory 1308 may include instructions performed by one or more servers or processors (e.g., processing circuit 1304), in some embodiments. In some embodiments, memory 1308 includes an operation data collector 1312, an operation data database 1314, a vertical market identifier 1316, a time period identifier 1318, and/or a control policy database 1320.

The model selector 1310 can include instructions performed by one or more servers or processors (e.g., processing circuit 1304), in some embodiments. In some embodiments, model selector 1310 may include a model manager 1322, a model ranker 1324, and/or a model database 1326.

In some embodiments, the system 1300 includes a model developer system 1350. The model developer system 1350 may include a processing circuit 1352. The processing circuit 1352 may include a processor 1354 and a memory 1356. The processor 1354 and the memory 1356 may be similar to or the same as the processor 1306 and the memory 1308. In some embodiments, the processor 1354 and the memory 1356 are more powerful and larger than the processor 1306 and the memory 1308. In some embodiments, the model developer system 1350 is a component of the environmental control system 1302. The memory 1356 can include instructions performed by one or more servers or processors (e.g., processing circuit 1352), in some embodiments. In some embodiments, the memory 1356 can include a model generator 1358. The model generator 1358 can include instructions performed by one or more servers or processors (e.g., processing circuit 1304), according to some embodiments. In some embodiments, the model generator 1358 can include reinforcement learning (RL) modeler 1360, a policy generator 1362, and a neural network generator 1364. In some embodiments, the memory 1356 can include a model trainer 1366. The model trainer 1366 can include instructions performed by one or more servers or processors (e.g., processing circuit 1352), in some embodiments. In some embodiments, the model trainer 1366 can include a neural network model trainer 1368. In some embodiments, the neural network model trainer 1368 is similar to or the same as model trainer 312.

In some embodiments, the system 1300 includes a network 1370. In some embodiments, the network is at least partially a wireless network. In some embodiments, network 1370 includes network based resources (e.g., computer system resources, databases, data centers, $3^{rd}$ party databases, etc.). In some embodiments, the network 1370 facilitates a connection between the environmental control system 1302 and the model developer system 1350. In some embodiments, network 1370 facilitates one or more data transfers between the environmental control system 1302 and the model developer system 1350. For example, data from the operation data database 1314 may be used by the model developer system 1350 through a connection with network 1370. In another example, the network 1370 may be configured to facilitate updates to the control policy database 1320, operation data database 1314, and/or model database 1326 based on network based resources. In some embodiments, the network 1370 may periodically or continuously update the control policy database 1320, model database 1326, and operation data database 1314 based on data stored in a network based resource (e.g., a centralized database, a distributed database, etc.). In some embodiments, the model developer system 1350 is permanently connected to the environmental control system (e.g., an add-on device, integrated into the environmental control system 1302). In some embodiments, the model developer system 1350 is selectively connected to the environmental control system 1302. For example, in some embodiments, the model developer system 1350 is a portable computing device (e.g., laptop, tablet, etc.) that is communicably connected to the environmental control system. In some embodiments, the model developer system 1350 is a server, cluster of computers, or other computing device that is communicably connected to the environmental control system 1302.

In some embodiments, the model developer system 1350 includes a user interface 1372. The user interface 1372 may be any user interface (e.g., display, keyboard, button, etc.) that facilitates the user interacting with (e.g., viewing, manipulating, etc.) the model developer system 1350 and/or any component of the system 1300 (e.g., building controller 1380, model manager 1322, control policy database 1320, etc.). In some embodiments, each of the environmental control system 1302 and the model developer system 1350 have one or more user interfaces 1372. In some embodiments, the user interface 1372 is communicably connected via a network (e.g., network 1370) to the model developer system 1350 and/or the environmental control system 1302.

In some embodiments, the system 1300 includes a building controller 1380 and building equipment 1382. Each of components 1302, 1350, 1380, and 1382 may communicate over a network (e.g., a synchronous or asynchronous network, network 1370, etc.). Building controller 1380 may be similar to or the same as BAS 200. Environmental control system 1302 may be a component of or within building controller 1380, according to some embodiments. The model selector 1310, model generator 1358, and model trainer 1366 and their components are described with reference to FIGS. 14-18.

Figure 14:
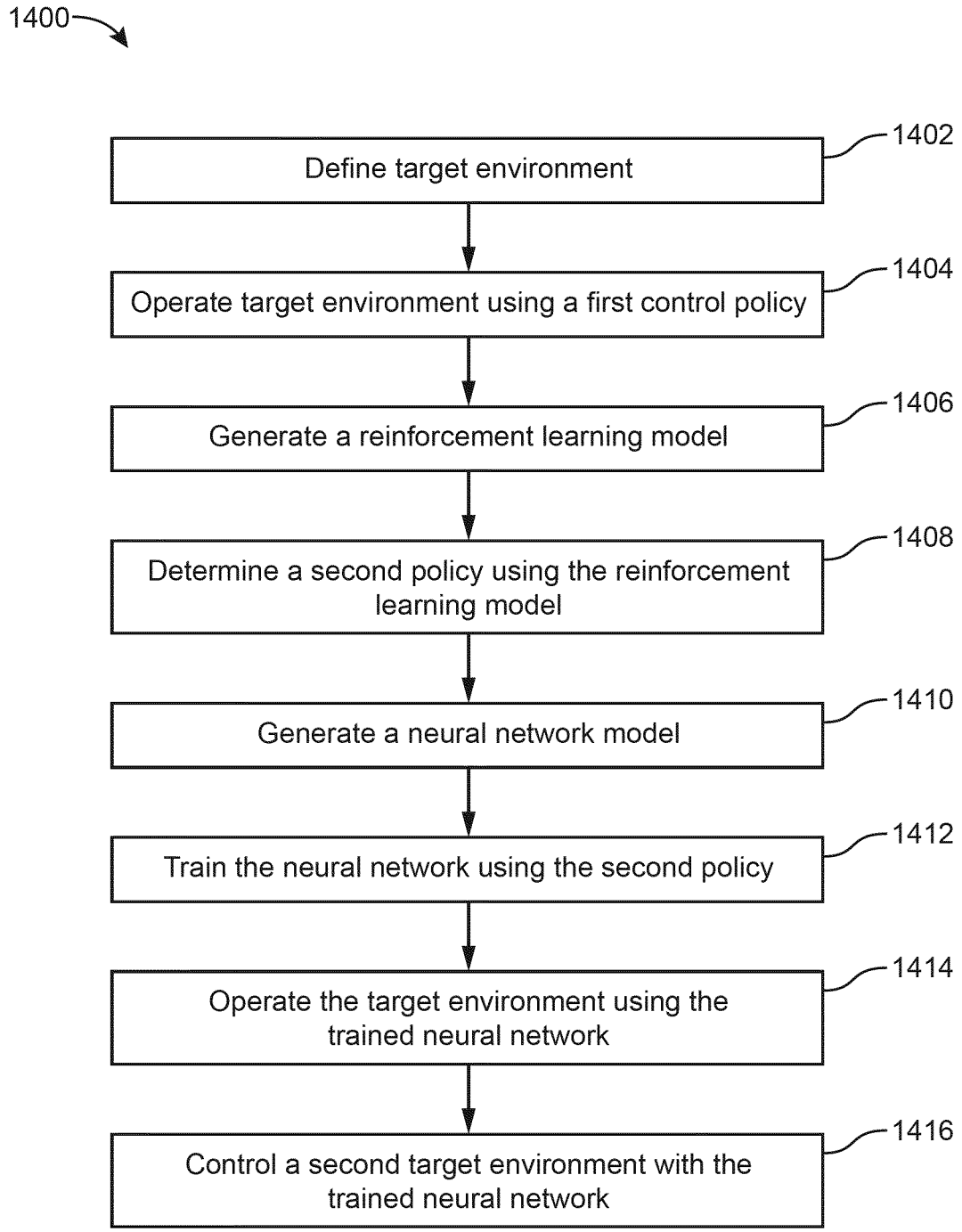
FIG. 14 is a flow diagram of a process for generating a prediction model for control of a building management system, according to an exemplary embodiment.

Referring now to FIG. 14, a flow diagram of a process 1400 for training a prediction model for control of a building management system is shown, according to an exemplary embodiment. Process 1400 may be performed by a data processing system (e.g., model developer system 1350 and/or environmental control system 1302), according to some embodiments. Process 1400 may include any number of steps and the steps may be performed in any order. As utilized herein, "target environment" refers to a facility (e.g., campus, building, house, controlled environment, etc.) or portion of a facility (e.g., zone, room, floor, group of floors, etc.) that are to be operated using an environmental control system (e.g., environmental control system 1302, 302).

At step 1402 the data processing system may identify one or more state-spaces of the target environment. In some embodiments, the one or more state-spaces may be determined from operation data stored in the operation data database 1314. In some embodiments, the target environment is surveyed (e.g., observed, searched, etc.) to determine the one or more state-spaces of the environment. For example, the target environment may be surveyed to determine a number of zones, size of zones, time, temperature, humidity, external condition, state of heating/cooling elements, hardware components, fans, actuators, lights, occupancy, sensors (e.g., temperature, occupancy, etc.), current setpoints, operational ranges, building subsystems (e.g., building subsystems 228), building equipment (e.g., building equipment 330), and other relevant parameters to determine one or more state-spaces of the target environment. In some embodiments, the survey is accomplished electronically (e.g., by analyzing BACnet objects) and/or in person. In some embodiments, the survey may identify the target inputs and outputs relevant to the desired objective (e.g., reduce energy usage, maximize cost savings, etc.). In some embodiments, the RL modeler 1360 may query operation data database 1314 and/or control policy database 1320 to retrieve data for defining a RL learning framework (e.g., MDP, POMDP, etc.) for the RL model. In some embodiments, the RL modeler 1360 and/or the policy generator 1362 may identify a first plurality of control policies. As described above with respect to FIG. 4, a control policy may be or include a number of state-spaces and/or action-spaces and a set of rules that the data processing system may use to control building equipment. Each control policy may have a different number and/or different variation of state-spaces, in some embodiments. In some embodiments, the control policy database 1320 is a network-based repository of control policies from one or more target environments and/or simulated target environments.

In some embodiments, the size of the state-space of the system is limited to a predetermined number of state variables (e.g., five, eight, one hundred, one thousand, etc.). In some embodiments, the target environment may be divided into one or more smaller target environments (e.g., sample environments) to correspond to a desired state-space size. For example, a large target environment (e.g., a high rise office building) may have multiple zones on each floor of the building. In such example, the target environment may be split into one or more sample environments (e.g., a group of zones, a floor, a group of floors, etc.) of the target environment. In some embodiments, a representative sample environment may be selected from a group of possible sample environments. The representative sample environment may be selected by determining the sample environment that represents a core of a repeated pattern in the target environment (e.g., a repeated floor, a repeated zone, etc.). In such embodiments, the representative sample environment may define the target environment for a reinforcement learning technique. A person having ordinary skill in the art will appreciate that sample environments may be selected based on other criteria, such as a tendency for being occupied, criticality of controllable variables (e.g., temperature, humidity, etc.), and still other suitable criteria, according to some embodiments. In some embodiments, the core of a repeated pattern of the target environment is selected by the policy generator 1362 a corresponding policy (e.g., a policy for the sample target environment representing the core of the repeated pattern of the target environment) may be provided to the RL modeler 1360. In some embodiments, the state-space of the representative sample environment is similar to the state-space of the other sample environments of the target environment (e.g., similar size, similar state variables, etc.).

At step 1404, the target environment is operated using an existing control policy and the states of the target environment are monitored and stored, according to some embodiments. In some embodiments, the building controller 1380 operates the target environment (e.g., building equipment 1382) using traditional control methods (e.g., PID control, PI control, etc.) to collect baseline operation data using operation data collector 1312. In such embodiments, at least one setpoint or state of a controllable object (e.g., heating/cooling element, subsystem setpoint, etc.) may be monitored and collected. In some embodiments, the data processing system may utilize collected operation data to determine a baseline action-space for the target environment. In such embodiments, the baseline action-space of the target environment may be used to determine approximate thresholds or limits for an action-space utilized by the RL modeler 1360. For example, the operation data collected by the operation data collector 1312 using existing control methods may indicate the operational ranges of the controllers and building equipment of the target environment. In some embodiments, the performance of the system (e.g., operating expenses, energy usage, etc.) using existing or traditional control methods may be recorded (e.g., stored in a database such as operation data database 1314) as baseline data. In some embodiments, the data collected by operation data collector 1312 and/or stored in operation data database 1314 is subject to a data quality pass. In some embodiments, the data quality pass may reduce noise in the collected data (e.g., normalize/average). In some embodiments, one or more states of the environment over time are collected into a database (e.g., operation data database 1314) for ease of querying. In some embodiments, operation data may be collected for a time period sufficient to define at least one of a state-space, an action-space, a transition probability function, and a reward function of the target environment. In some embodiments, the operation data is collected for a predetermined period (e.g., 1 minute, 1 day, 1 week, 1 month, 1 year, 3 years, 5 years, etc.). In some embodiments, operation data is indefinitely collected by operation data collector 1312 and stored in operation data database 1314. In some embodiments, operation data stored in operation data database 1314 is processed by RL modeler 1360 to determine one or more of a state-space, action-space, and/or transition probability function of the target environment.

At step 1406, the data processing system generates a predictive model (e.g., a reinforcement learning model), according to some embodiments. In some embodiments, the reinforcement learning model is generated by the RL modeler 1360. In some embodiments, the reinforcement learning model includes an agent that is configured to take semi-random actions available in an action-space. In some embodiments, the reinforcement learning model is defined as a Markov decision process. In such embodiments, the state-space, action-space, transition probability function, and reward function is known or determined. In some embodiments, the state-space, action-space, transition probability function, and reward function, is determined by the RL modeler 1360 and/or policy generator 1362 by analyzing operation data (e.g., operation data collected by operation data collector 1312). For example, operation data (e.g., operation data stored in operation data database 1314) may be used to determine the probability that the current state (e.g., a zone-air temperature of 21 degrees Celsius, lights off, etc.) will transition to a different state (e.g., a zone-air temperature of 22 degrees Celsius, lights on, etc.) at the next step in time, by taking an action (e.g., set controller setpoint+1 degree, set lights to on, etc.). As described above, in some embodiments, the RL model may be defined as a partially observable Markov decision process (POMDP). In such embodiments, as described in detail above, one or more of the state tuple, state transition probability tuple, action tuple, and reward tuple may be unknown or only partially observable. In some embodiments, the transition probability tuple may be determined using a Monte-Carlo evaluation method. In some embodiments, the transition probability tuple is determined using a temporal-difference learning method. In some embodiments, the RL modeler 1360 may use DQN, double DQN, Vanilla DQN, policy iteration, value iteration, and other reinforcement learning methods and algorithms to determine a control policy for mapping states to actions.

In some embodiments, the transition probability tuple, P, is defined as the probability that the current state, $s_t$, will transition to the next state, s', at the next time interval, t+1, given that the current state, $s_t$, is the state, s, and the current action, $a_t$, is the action, a. The state, s, and action, a, are values from a set of all states (e.g., the action-space), S, and actions (e.g., the action-space), A, such that s∈S, and a∈A. The transition probability tuple, $P_a$, may be defined as shown in the equation below:

$$P_a(s,s')=Pr\{s_{t+1}=s'|s_t=s,a_t=a\}$$

In some embodiments, a reward value for being in a state is determined by the RL modeler 1360. In some embodiments, the reward value is the main parameter used to train an agent in a MDP. In some embodiments, the reward is calculated by comparing the current power consumption to that of a baseline control policy (e.g., baseline performance). In some embodiments, the reward is calculated by comparing the current power consumption to the power consumption of a control system using a rules-based control policy. In some embodiments, if the power consumption of the action taken by the agent is less than a baseline value of power consumption, a positive reward is assigned. In some embodiments, if the power consumption of the action taken by the agent is more than a baseline value of power consumption, a negative reward is assigned. In some embodiments, the reward is a probabilistic measure. In some embodiments, the reward is defined as the expected reward, $r_{t+1}$, at the next state, s', given the current state, $s_t$, current action, $a_t$, and most probable next state, s'. The reward tuple, $R_a$, may be defined as shown in the equation below:

$$R_a(s,s')=E\{r_{t+1}=s'|s_t=s,a_t=a,s_{t+1}=s'\}$$

In some embodiments, the agent seeks to maximize the reward by taking an action that aligns with the current objective (e.g., reduces energy consumption). In some embodiments, the objective may include time objectives, (e.g., achieve or maintain a zone-air temperature setpoint within a set timeframe), and may include considerations for keeping one or more control variables within a defined dead-band (e.g., a dead-band associated with user comfort).

In some embodiments, the agent may take actions as part of an exploration period, where the agent moves through the environment (e.g., moves between states of the environment by taking random actions) to learn (e.g., determine, estimate, etc.) the transition probabilities and/or rewards for taking actions based on a current state. In some embodiments, the action-space for the exploration period is defined at least partially based on equipment manufacturer limitations (e.g., heating/cooling hardware operational constraints) and/or user comfort thresholds.

In some embodiments, a value, V, is defined. In some embodiments, the value, V, is the summation of all the rewards the agent can achieve before it reaches a terminal state. For example, an episodic MDP may define a terminal state as achieving a temperature setpoint. In some embodiments, the value, V, is an array that is indexed by state, s. In some embodiments, the value, V, causes the agent to consider long term benefits (e.g., cumulative rewards over time). For example, given a current state with an unknown value, V, the agent may take only the most immediately rewarding action (e.g., turn off system), without considering long term implications. In some embodiments, the expected total value, V, at state, s, using policy, π, is equal to the overall expected value, E, using policy, π, given the current state action pair, $<s_t, a_t>$. In some embodiments, the value, V, encourages exploration by including a discount factor, y. In some embodiments, the discount factor, y, has a value less than 1 so that at each step, t, the discount factor, y, decreases. In some embodiments, the value, V, may be defined as shown in the equation below:

$$V^\pi = E_\pi \left\{ \sum_{k=0}^{n} y^k r_{t+k+1} \mid s_t = s, a_t = a \right\}$$

In some embodiments a policy, π, is defined. In some embodiments, the policy, π, is an array that is indexed by state, s. In some embodiments, the policy, π, at state, s, may define the current action, $a_t$. In some embodiments the policy generator 1362 defines an optimal policy, π*, that maps states to optimal actions. In some embodiments, the optimal action is defined as the action that results in the maximum expected cumulative discounted reward for the current state and the future state given the current policy, π, using the policy, π. In some embodiments, the policy generator 1362 may use an algorithm to recursively update a new estimation of the optimal policy, π*, and value, $V^\pi$ using a previous estimation of the optimal policy, π*, and the value, V. The optimal policy action, π*(s), may be defined as shown in the equation below:

$$\pi^*(s) = \mathrm{argmax}_a \sum_{s'} P_a(s, s') \, V^\pi(s')$$

Each control policy may have a different number and/or different variation of state-spaces, in some embodiments. Furthermore, each control policy may have a different number or different variation of action-spaces. The data processing system may use control policies to determine actions or values for control variables for any point of a building. In some embodiments, the data processing system determines an optimal policy, by, for example, an iterative method (e.g., a value iteration and/or policy iteration method), or any of the other methods described herein.

In some embodiments, at least a portion of the reinforcement learning model may be viewed as a directed graphical model. In such embodiments, the directed graphical model may include nodes for the states in the state-space, nodes for the actions in the action-space, and edges representing probabilities. In some embodiments, the edges of the directed graphical model include visual representations of rewards for taking an action based on a current state and transitioning to a next state. The directed graphical model may be generated by the RL modeler 1360 and may be output (e.g., displayed) on the user interface 1372. In some embodiments, a directed graphical model is supplied to the neural network generator 1364 as training data. A directed graphical model is described in more detail with reference to FIG. 18.

In some embodiments, the building controller 1380 is controlled based on an initial control policy generated by policy generator 1362. In some embodiments, the initial control policy may be determined using a reinforcement learning model having random state transition probabilities. In some embodiments, the initial control policy may reward exploration and reward taking actions that lead to changing states. For example, actuators and heating/cooling elements may be operated randomly within thresholds that prevent damage to the target environment while the agent learns the environment (e.g., determines transition probabilities and/or rewards). The resulting behavior of the system (e.g., next state following the action) may be collected by operation data collector 1312. In some embodiments, the agent (e.g., learner, program to be trained) of the reinforcement learning model selects a random action available in the action-space based on the present state according to the initial control policy, and updates the initial control policy based on feedback from the environment. In some embodiments, the agent (e.g., learner, program, etc.) explores the environment using the initial control policy and the data processing system updates a different control policy. In some embodiments, various control variables (e.g., setpoints) may be randomly varied within a tolerance band that is associated with occupant comfort. Varying the control variables (e.g., setpoints) within a tolerance band may allow the target environment to remain usable (e.g., habitable, occupiable, etc.) during one or more data collection periods. As described above, in some embodiments, the initial training period may be 3-18 months in some embodiments. In some embodiments, the initial training period is longer than 18 months or shorter than 3 months.

At step 1408 the target environment is operated using a policy based on the reinforcement learning model, according to some embodiments. In some embodiments, the policy is different than the initial control policy and the original control policy. In some embodiments, the target environment may be operated using an optimal control policy determined using the reinforcement learning model, as described above. In some embodiments, the policy is determined using a reinforcement learning model defined in a MDP or a POMDP. In some embodiments, the performance of the system (e.g., energy consumption, energy costs, etc.) is associated with the control policy. In some embodiments, the performance of the system using the control policy based on the reinforcement learning model may be compared with the performance of the system using the initial control policy and/or to the performance of the system using the baseline control method.

At step 1410, a second predictive model (e.g., a neural network model) is generated, according to some embodiments. In some embodiments, the neural network model is generated by the neural network generator 1364. The neural network may be a multi-layer perceptron (MLP), convolutional neural network model (CNN), or any other neural network model known in the art. In some embodiments, the neural network has an input layer, an output layer and one or more hidden layer(s). In some embodiments the neural network includes two or more hidden layers (e.g., a deep neural network). A neural network is described with respect to FIG. 17.

At step 1412, the neural network model is trained, according to some embodiments. In some embodiments, the neural network may be trained by one or more sets of data associated with a control policy. In some embodiments, the neural network is trained using one or more sets of data associated with an optimal control policy. The neural network may be trained by the neural network model trainer 1368. In some embodiments, state action pairs are supplied to the neural network as training data. In some embodiments, the optimal policy of the reinforcement learning model may be the target output of the neural network. In some embodiments, the neural network is trained using a supervised learning technique. For example, a current state, $s_t$, may be supplied to the neural network and also to the optimal policy, $\pi^*$, and an error may be determined between the action selected by the neural network and the action output from the optimal policy function. The neural network model trainer 1368 may use various training techniques (e.g., gradient descent, stochastic gradient decent, newton's method, conjugate gradient method, quasi-newton method, etc.) to train the neural network to behave according to the training data supplied to the neural network. As such, a large volume of high quality training data (e.g., state action pairs, state and optimal action pairs, etc.) is desirable for training the neural network, according to some embodiments. In some embodiments, the set of training data includes a high volume of realistic variation. In some embodiments, the sets of training data are obtained after an optimal policy has been generated by the policy generator 1362. In some embodiments, the neural network is trained using a semi-supervised learning technique. For example, not all states provided to the neural network as training data may be tied to an optimal action. In some embodiments, the training data set is split into one or more parts. In some embodiments, a first part of the data set is used to train the neural network (e.g., 80% of the data set), and a second part of the data set is used to test the trained neural network model (e.g., 20% of the training data set) to verify that the model predicts a real outcome. In some embodiments, the neural network may be at least partially trained using one or more methods for preventing overfitting (e.g., cross-validation, data augmentation, ensembling, early stopping, etc.).

At step 1414, the trained neural network is used to control the target environment, according to some embodiments. In some embodiments, the trained neural network is added to the model database 1326. In some embodiments, one or more trained neural networks are stored in the model database 1326 and the one or more trained neural networks are ranked by the model ranker 1324 based on ranking criteria. For example, the model ranker 1324 may rank various models based on past performance over various test periods, complexity, size, accuracy, etc. In some embodiments, the most recently trained neural network model is selected by the model ranker 1324. The model ranker 1324 may provide one or more of the top ranked models from the model database 1326 to the model manager 1322. The model manager 1322 may periodically provide each of the highest ranked models to the building controller 1380. For example, a first trained neural network model may be used to generate actions (e.g., setpoints) for the building controller 1380 for a first time period (e.g., 1 week, 1 month, 1 year, etc.). The operation data collector 1312 may collect performance data (e.g., energy consumption, energy costs, etc.) for each of the respective highest ranked models over the test period. The best performing model (e.g., lowest energy consumption, lowest energy costs, etc.) may be selected by the model manager 1322 for long term control over the target environment. In some embodiments, the model database 1326 is updated with new and different models from the network 1370. For example, models from other target environments or simulated target environments may be copied to the model database 1326 from network-based resources. In some embodiments, the environmental control system 1302 is installed in a target environment associated with a category (e.g., high-rise residential, data center, office tower, a particular vertical market, a business vertical, a system configuration, etc.). In such embodiments, the model database 1326 may be updated with models relevant to the category of the target environment. In some embodiments, the control of the target environment using the model is closely monitored (e.g. by an administrator performing regular visits to read out data) to tune and verify the model, and also determine the benefit of the model. In some embodiments, the performance of the system using the model is compared to the performance of the system using the policy determined using the reinforcement learning model (e.g., optimal policy), and/or the performance of the system using the baseline control policy.

At step 1416, the model (e.g., trained neural network model) is applied to similar target environments. In some embodiments, the trained neural network is applied to other sample environments of the target environment (e.g., other floors, rooms, zones, spaces, etc.). In some embodiments, the trained neural network is supplied to other environmental control systems connected to network 1370. In some embodiments, a target environment may be controlled using a trained neural network that behaves similarly to an optimal policy determined using a reinforcement learning model, without determining or defining a unique optimal policy for the target environment. For example, a target environment in a first vertical (e.g., high-rise residential, data center, office tower, etc.) may have a developed and/or trained neural network model using one or more of the steps 1402-1414. In such example, a second target environment in the first vertical may be controlled using the trained neural network of the first target environment. In some embodiments, target environments are categorized based on other criteria such as a geographical location, utility power supplier, system hardware, environment size, environment hardware age, and still other suitable criteria for categorizing one or more target environments. In some embodiments, the target environment is categorized based on collected operation data In some embodiments, one or more trained neural network models are stored in model database 1326 for a variety of categories of target environments.

Figure 15:
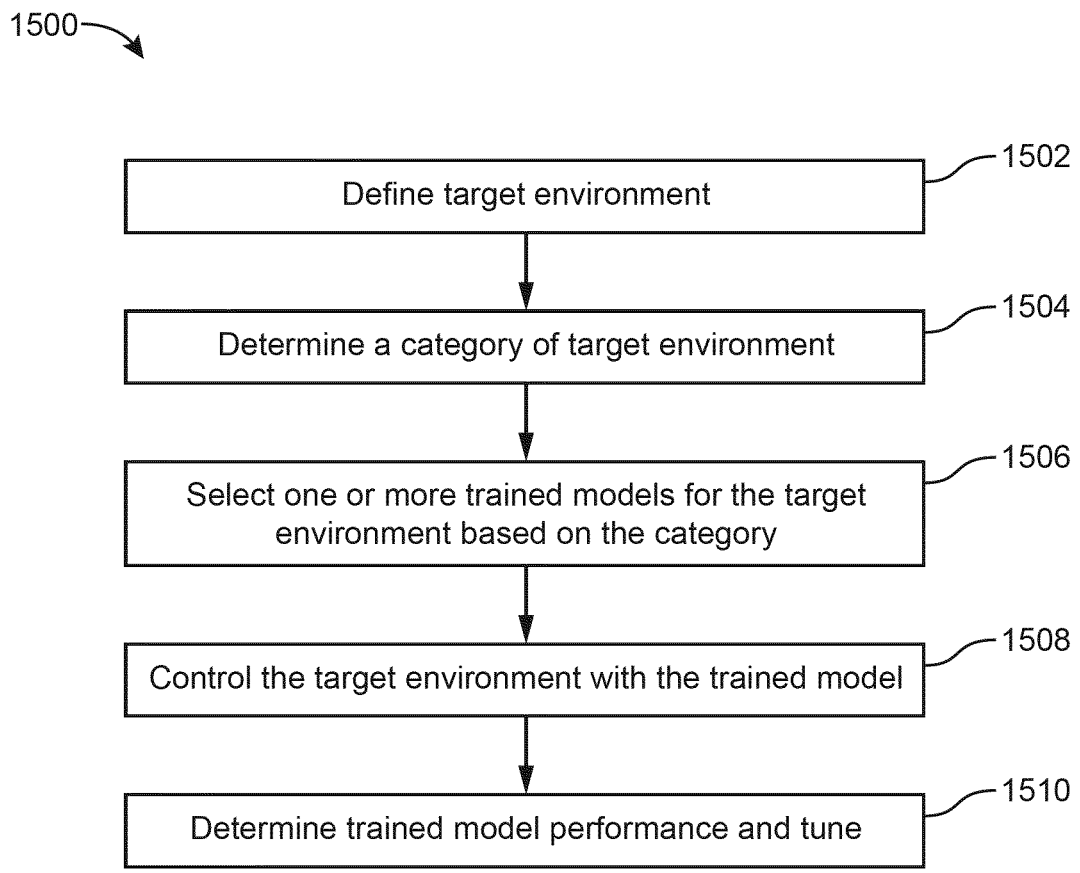
FIG. 15 is a flow diagram of a process for using a prediction model for control of a building management system, according to an exemplary embodiment.

Referring now to FIG. 15, a flow diagram of a process 1500 for using a prediction model for control of a building management system is shown, according to some embodiments. Process 1500 may include any number of steps and the steps may be performed in any order. In some embodiments, some or all of process 1500 may be performed on one or more components of system 1300.

At step 1502, the data processing system may identify one or more state-spaces of the environment. In some embodiments, the target environment is surveyed to determine the parameters of the system relevant to the objective. In some embodiments, the data processing system may determine the size of the state-space and/or action-space. In some embodiments, the survey is accomplished electronically (e.g., by analyzing BACnet objects) and/or in person. In some embodiments, the survey may identify the target inputs and outputs relevant to the desired objective (e.g., reduce energy usage, maximize cost savings, etc.). In some embodiments, step 1502 is similar to or the same as step 1402.

At step 1504, the data processing system determines a category of the target environment using operation data stored in operation data database 1314. In some embodiments, the vertical market identifier 1316 determines a vertical market of the target environment. In some embodiments, the target environment is categorized based on other criteria such as a geographical location, utility power supplier, system hardware, environment size, environment hardware age, and still other suitable criteria for categorizing one or more target environments. In some embodiments, the target environment is categorized based on operation data stored in the operation data database 1314.

At step 1506, the data processing system may query the model database 1326 to obtain one or more models (e.g., prediction models, trained neural network models, etc.) that are associated with the category (e.g., vertical market). The models may be evaluated by the model ranker 1324. The highest performing model may be selected by the model manager 1322. In some embodiments, the model database 1326 maintains a single model for each category of a target environment. In some embodiments, the model database 1326 maintains a plurality of models for a category of a target environment. In some embodiments, the model database 1326 includes a library of models corresponding business vertical categories. The model ranker 1324 may use any criteria (e.g., past performance, model complexity, model size, model state-space and action-space similarity to target environment, etc.) to rank the one or more models. In some embodiments, the one or more models stored in the model database 1326 are neural network models trained using one or more steps of the process 1400.

At step 1508, the data processing system may control the target environment using the outputs from the model selected by the model manager 1322. In some embodiments, the model manager 1322 may provide setpoints and other actions to the building controller 1380 according to the selected model.

At step 1510, the data processing system may monitor the performance of the model applied to the target environment and tune the model based on the model's performance. For example, the model used by the model manager 1322 may determine actions (e.g., setpoints) for the building controller 1380. The building controller 1380 may hold the control variables within a comfort and/or tolerance band of the system, and may notify an administrator of the system 1300 if the model is behaving poorly. For example, the model may behave poorly by supplying setpoints or other control decisions that would drive the control variables outside of the tolerance band or when the model is takes actions that are most costly than a baseline control policy. In some embodiments, a model that is behaving poorly may be tuned (e.g., via hyper parameter tuning, supplemental training, etc.) to behave properly, or may be replaced by another model in the model database 1326. In some embodiments, the model ranker 1324 ranks each model in the model database 1326 using a suitability score (e.g., adaptability score, etc.). The suitability score may be assigned based on a model's success (e.g., acceptable behavior) or failure (e.g., poor behavior) in other target environments in the category. In some embodiments, the suitability score identifies models that are overfitting to the original target environment which causes the trained model to not behave well in other target environments. For example, an overfitting model may learn noise or random fluctuations in the set of training data which may not be present in other target environments, which may cause the model to have poor performance in controlling other environments. In some embodiments, the suitability score may be determined based on, for example, the number of changes made to the model, a number of target environments using the model, or may be manually entered by an administrator of the data processing system upon completing a tuning operation to fit the model to the target environment. For example, the neural network may be tuned by adjusting the model's hyperparameters (e.g., number of neurons, activation function, learning rate, epochs, batch side, optimizer, etc.). In some embodiments, the number of layers in the neural network may be tuned (e.g., reduced or increased) to correct overfitting or underfitting.

In some embodiments, the model, suitability score, and any adjustments to the model are saved to the model database 1326. The updated model may be saved as a new model in the model database 1326, and/or may replace the existing model in the model database 1326. For example, a "high-density residential" model may be replaced with an updated "high-density residential" model (e.g., a tuned "high-density residential" model), according to some embodiments. In some embodiments, the model database 1326 only includes a single model. The single model may be a large model that includes enough parameters to cover all target environments in the category. In some embodiments, data collected from one or more data processing systems is collected into a network-based resource (e.g., a network-based database), and the collected data is used to refine (e.g., tune, train, expand, trim, etc.) the models corresponding to the various target environment categories.

Figure 16:
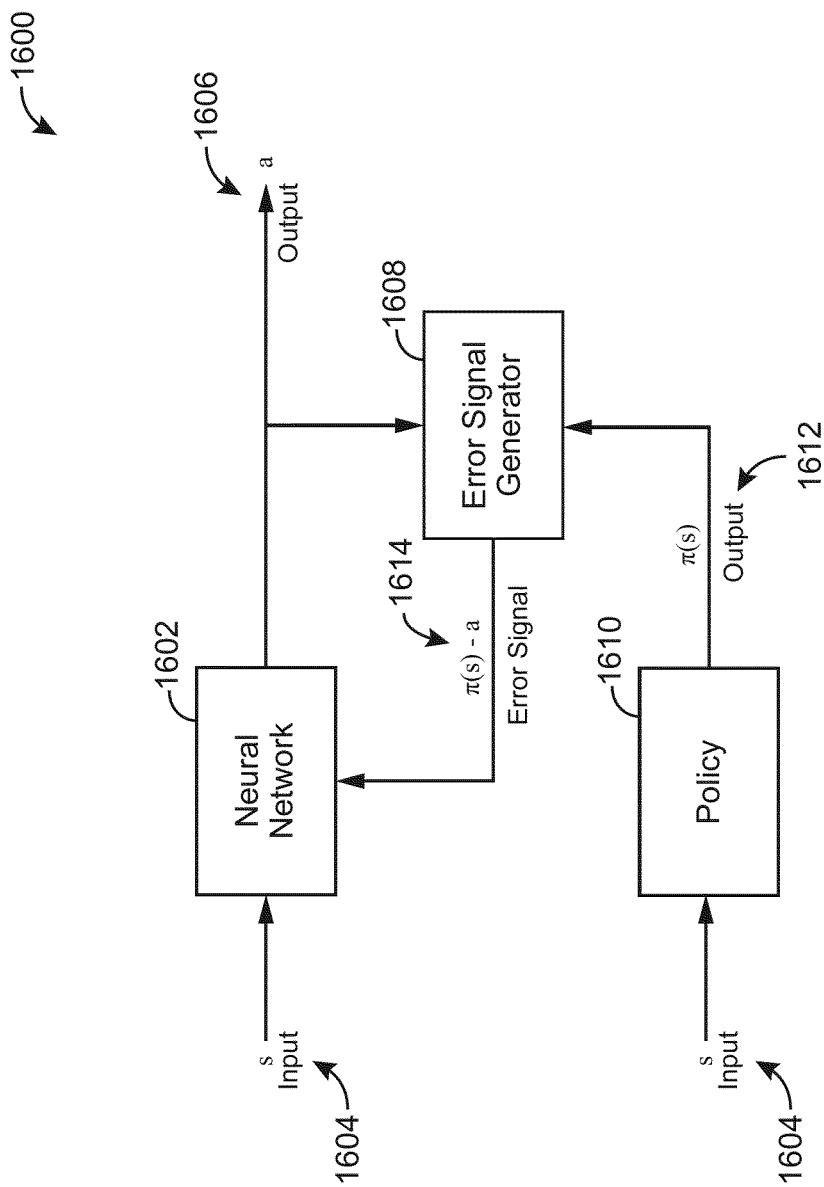
FIG. 16 is a block diagram of training a neural network model using a control policy, according to an exemplary embodiment.

Referring now to FIG. 16, a block diagram of a neural network model training system 1600 is shown, according to some embodiments. In some embodiments, the system 1600 is similar to or a component of the neural network model trainer 1368. In some embodiments, the neural network model 1602 is supplied an input 1604. The input 1604 may be a state, s, of the target environment. In some embodiments, the neural network model 1602 is supplied a state, s, and an action space, $A_s$, for the state. The neural network model 1602 may generate an output 1606. The output 1606 may be an action, a. The output 1606 may be supplied to an error signal generator 1608. In some embodiments, the input 1604 is supplied to a policy 1610. The policy 1610 may generate a policy output 1612. In some embodiments, the policy 1610 is an optimal policy determined using a reinforcement learning model. In some embodiments, the policy 1610 produces a policy output 1612. The policy output 1612 may be provided to the error signal generator 1608. The error signal generator 1608 may determine an error signal 1614 based on the output 1606 and the policy output 1612. In some embodiments, the error signal 1614 includes a difference between the output 1606 and the policy output 1612. In some embodiments, one or more values of the neural network (e.g., weights) of the neural network are adjusted based on the error signal 1614. In some embodiments, multiple inputs 1604 (e.g., states) are applied to the system 1600, and the neural network 1602 is adjusted (e.g., trained) using each input 1604 until the error signal 1614 reaches a threshold value. In some embodiments, the neural network 1602 is trained on some or all of the states in the state-space of the policy 1610. In some embodiments, the neural network 1602 may be trained using a first policy and subsequently trained using a second policy that is different from the first policy. For example, the neural network 1602 may be trained using a first policy and a second policy from a target environment category (e.g., vertical market, geographical location, etc.).

Figure 17:
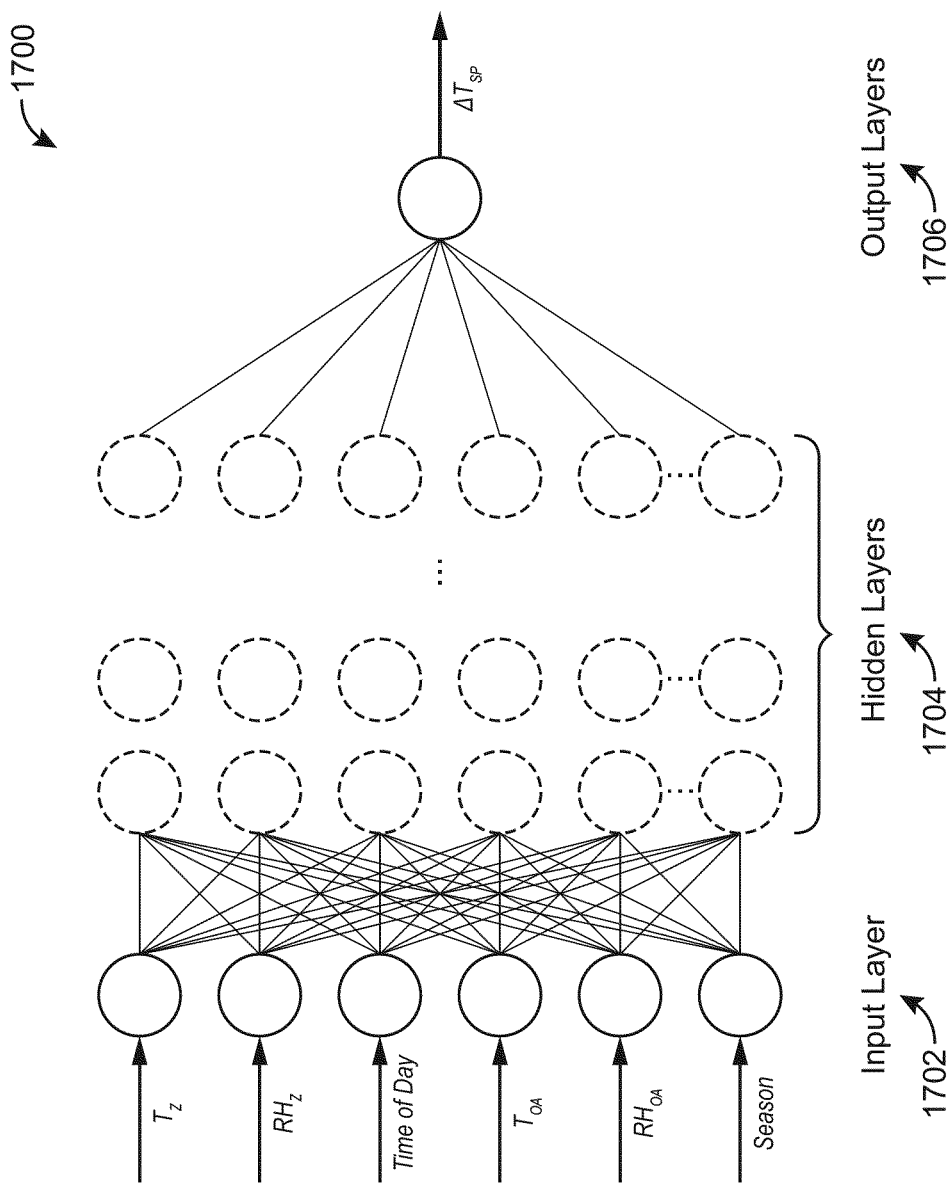
FIG. 17 is a drawing of a neural network model, according to some embodiments.

Referring now to FIG. 17, an illustration 1700 of a prediction model (e.g., a neural network) for predicting changes in setpoints is shown, according to some embodiments. In some embodiments, the neural network model of illustration 1700 is generated by neural network generator 1364 described above with reference to FIG. 13. In some embodiments, the neural network model of illustration 1700 includes an input layer 1702, a hidden layer(s) 1704, and an output layer 1706. Input layer 1702 is shown to include multiple input neurons. Each input neuron may be associated with a different state variable of the target environment. For example, in illustration 1700, the input neurons are shown to receive values of a zone temperature $T_z$, a zone relative humidity $RH_z$, a time of day, an outdoor air temperature $T_{oa}$, an outdoor relative humidity $RH_{oa}$, and a season. It should be appreciated that said variables are shown for sake of example.

The neural network of illustration 1700 is also shown to include hidden neurons in hidden layer(s) 1704. Depending on the type of neural network model utilized, hidden layer(s) 1704 may include various numbers of hidden layers and/or various numbers of hidden neurons therein. For example, hidden layer(s) 1704 of a first neural network may include only one hidden layer with a particular number of hidden neurons, whereas hidden layer(s) 1704 of a second neural network may include more than one hidden layer, each layer having a particular number of hidden neurons. In some embodiments, the weights of the hidden neurons are trained using a supervised learning method. In some embodiments, the hidden layers are trained using the neural network model training system 1600 of FIG. 16. The trained neural network of illustration 1700 can output a value of the predicted setpoint change, $\Delta T_{sp}$. In some embodiments, the neural network of illustration 1700 is trained to output one or a combination of actions available in the action-space of the target environment.

Figure 18:
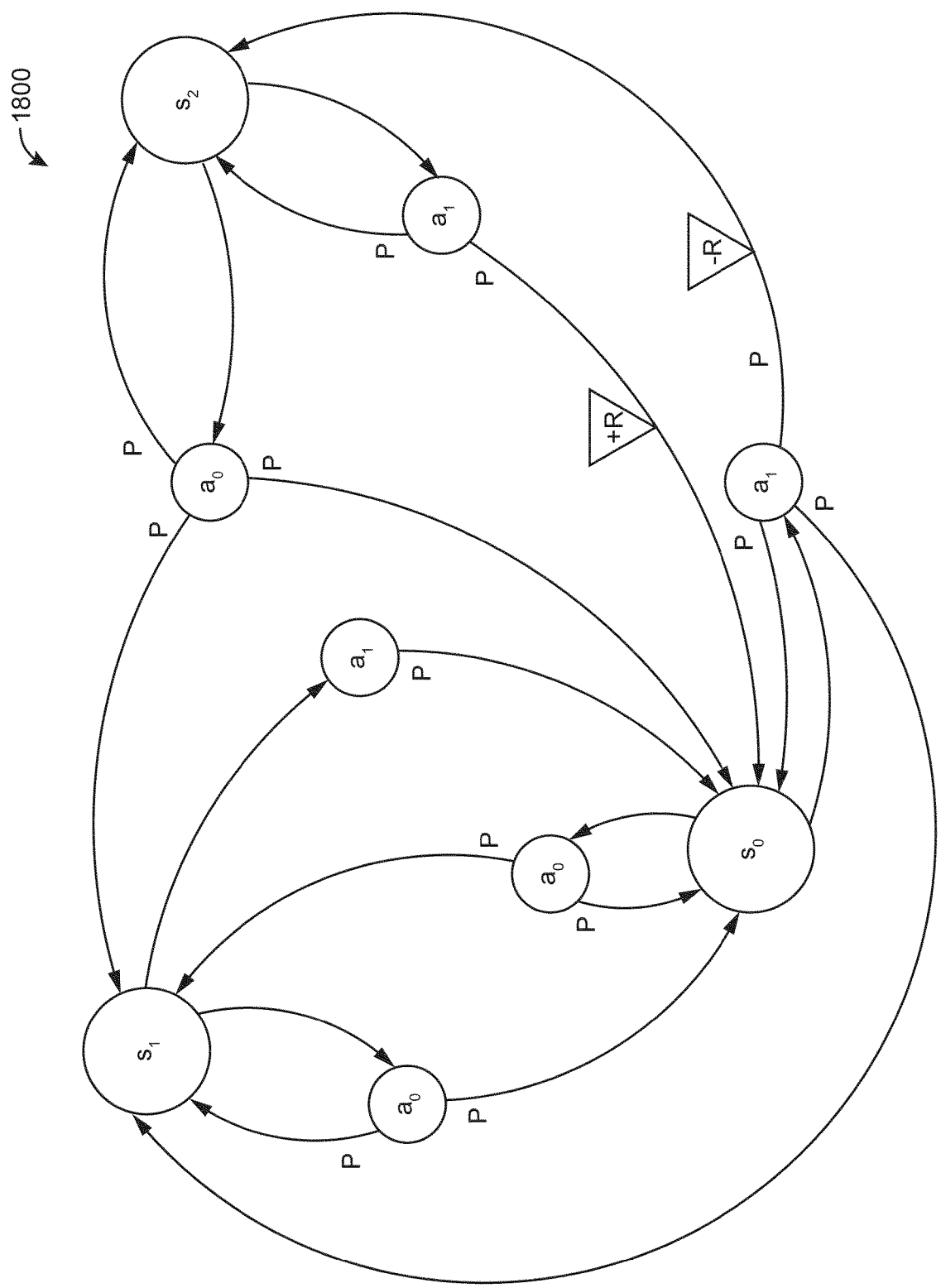
FIG. 18 is a drawing of a directed graphical model, according to some embodiments.

Referring now to FIG. 18, an illustration 1800 of a directed graphical model is shown, according to some embodiments. The directed graphical model of illustration 1800 may be generated by model generator 1358. The directed graphical model of illustration 1800 includes nodes representing states $s_1$, $s_2$, and $s_3$, and nodes representing actions, $a_0$, $a_1$. In the illustration 1800, for each state, $s_1$, $s_2$, and $s_3$, there are two actions available, $a_0$, $a_1$. The probabilities, P, of transitioning to the next state (e.g., $s_1$ or $s_2$) based on the available actions, $a_0$, $a_1$, are shown as edges. In some embodiments, the probabilities P are numerical values between zero and one. The probabilities of leaving each action node sum to one. Certain edges include rewards, +R, −R, that are earned by the agent when the agent transitions to the corresponding state. For example, an agent may be in state $s_2$, take action $a_1$, and earn a reward, +R, by transitioning to state $s_0$. In some embodiments, a directed graphical model may be used to train a prediction model (e.g., a neural network). For example, the one or more of the inputs to the directed graphical model (e.g., states, actions, transition probabilities, rewards, etc.) may be used as training data for a neural network. In some embodiments, after a neural network has been trained using the directed graphical model, the neural network can map the current state to an output (e.g., action) that will maximize the overall efficiency of the system.

Figure 19:
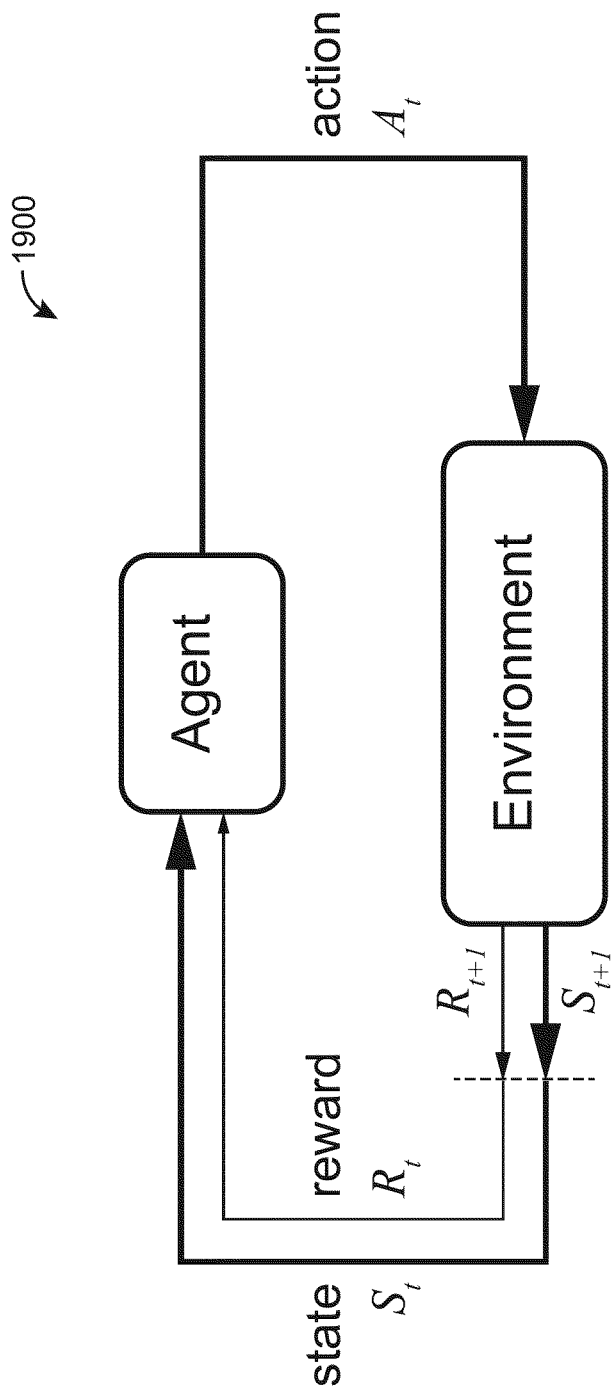
FIG. 19 is a block diagram of a reinforcement learning problem, according to some embodiments.

Referring now to FIG. 19, a block diagram of a reinforcement learning problem is shown. An agent (e.g., learner), in the current state, $s_t$, takes an action, $A_t$, to interact with the environment. The state of the environment at the next step in time, $S_{t+1}$, and reward, $R_{t+1}$ for entering the state $S_{t+1}$, is output from the environment based on the action, $A_t$, and become the current state, $S_t$, and reward, $R_t$ used by the agent for determining the following action.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system, comprising:
one or more memory devices configured to store instructions thereon that, when executed by one or more processors, cause the one or more processors to:
access a library of neural network models associated with a plurality of different business vertical categories;
retrieve a first neural network model from the library based on a first business vertical category associated with the building management system, wherein the first neural network model is trained on building operation data of a previous time period, wherein the building operation data of the previous time period is associated with the first business vertical category;
generate, using the first neural network model, a control decision for equipment operated by the building management system; and
control the equipment to affect a physical condition of a building in accordance with the control decision.

2. The building management system of claim 1, wherein the first neural network model comprises a reinforcement learning model, and wherein the instructions cause the one or more processors to generate the control decision by determining a control policy comprising one or more state-spaces for the reinforcement learning model.

3. The building management system of claim 1, wherein the plurality of different business vertical catagories comprise residential, data center, and office tower.

4. The building management system of claim 1, wherein the instructions further cause the one or more processors to determine a second prediction model based on the first neural network model, and wherein the building management system is operated using the second prediction model.

5. The building management system of claim 4, wherein the second prediction model comprises a second neural network model trained based on at least one output of the first neural network model.

6. The building management system of claim 4, wherein the second prediction model comprises a second neural network model trained based on at least one state from a state-space of a control policy determined based on the first neural network model and an action of the control policy for the at least one state.

7. The building management system of claim 2, wherein the control policy comprises one or more action-spaces, and wherein the one or more action-spaces comprises one or more of a potential zone-air temperature setpoints.

8. The building management system of claim 1, wherein the building operation data is based on both of simulated data and real-time building operation data.

9. A method for a building management system, comprising:
providing a library of neural network models associated with a plurality of different business vertical categories;
selecting, by a processing circuit, a first neural network model from the library based on a first business vertical category associated with the building management system, wherein the first neural network model is trained based on building operation data of a previous time period, wherein the building operation data of the previous time period is associated with the first business vertical catagory; and
operating, by the processing circuit, the building management system using the first neural network model.

10. The method of claim 9, further comprising providing a first control policy, wherein the first control policy comprises a baseline policy, wherein the first neural network model corresponds to a second control policy determined based on a reward performance, the method further comprising generating, by the processing circuit, a second prediction model based on the second control policy, and operating, by the processing circuit, the building management system using the second prediction model.

11. The method of claim 10, wherein the second prediction model comprises a second neural network model trained based on at least one state of a state-space of the second control policy and an action of the second control policy based on the at least one state.

12. The method of claim 9, wherein the building operation data includes one or more of current values, previous values, or forecasts for various points of a space of a building operatively connected to the processing circuit.

13. A building management system, comprising:
building equipment operatively connected to one or more processors; and
one or more memory devices configured to store instructions thereon that, when executed by the one or more processors, cause the one or more processors to:
access a library of neural network models associated with a plurality of different business vertical categories;
retrieve a first neural network model from the library based on a first business vertical category associated with the building management system, wherein the first neural network model is trained based on building operation data of a previous time period, wherein the building operation data is associated with the first business vertical category; and
control the building equipment using the first neural network model.

14. The building management system of claim 13, wherein the first neural network model is configured to determine a first value for a setpoint for the building equipment based on a current state of the building equipment.

15. The building management system of claim 13, wherein the first neural network model is a reinforcement learning model.

16. The building management system of claim 14, wherein the library comprises a second neural network model corresponding to a second business vertical category, wherein the second neural network model is configured to determine a second value for the setpoint, wherein the second value is different than the first value.

* * * * *